United States Patent

[11] 3,618,027

[72] Inventor Tse-yun Feng
Dewitt, N.Y.
[21] Appl. No. 23,306
[22] Filed Mar. 27, 1970
[45] Patented Nov. 2, 1971
[73] Assignee Research Corporation
New York, N.Y.

[54] ASSOCIATIVE MEMORY SYSTEM WITH REDUCED REDUNDANCY OF STORED INFORMATION

18 Claims, 19 Drawing Figs.

[52] U.S. Cl. ... 340/172.5
[51] Int. Cl. ... G06f 15/00
[50] Field of Search ... 340/172.5

[56] References Cited

UNITED STATES PATENTS

| | | | |
|---|---|---|---|
| 3,332,069 | 7/1967 | Joseph et al. | 340/172.5 |
| 3,354,436 | 11/1967 | Winder | 340/172.5 |
| 3,388,381 | 6/1968 | Prywez et al. | 340/172.5 |
| 3,405,395 | 10/1968 | Wallin | 340/172.5 |
| 3,475,733 | 10/1969 | Gaines et al. | 340/172.5 |

*Primary Examiner*—Gareth D Shaw
*Assistant Examiner*—Ronald F Chapuran
*Attorneys*—Robert S. Dunham, P E. Henninger, Lester W Clark, Gerald W. Griffin, Thomas F. Moran, R. Bradlee Boal, Christopher C. Dunham, Robert Scobey and Thomas P. Dowd

ABSTRACT: Disclosed is an associative memory system organized in a novel manner to reduce substantially redundancy of the stored information. The invented system operates on the descriptors (or tags) of information items which may also include other data stored in a secondary memory. Each of the descriptors is subdivided into a number of fields, each field storing a data element. The data elements of each field from all descriptors are stored in a basic associative memory (BAM) such that each BAM stores only data elements which are distinct from each other. Redundancy of data elements in a BAM is thus eliminated. The relationships between the data elements of the several fields of a descriptor are stored in a relation cube which may be in the form of an associative processing unit storing, like a conventional associative memory, words which correspond in number to the descriptors stored in the BAMs and consist of the same number of fields, but contain in the fields shorter codes representing the corresponding data elements. Alternatively, the function of the relation cube is carried out by a multidimension matrix of special storage elements in order to afford further reduction of storage redundancy. Each of the basic associative memories and, in some cases the matrix, may be decomposed into several distinct levels. The decomposition results in further elimination of redundancy.

The invented associative memory system allows a variety of point and line searches, and allows for resolution of multiple responses by different types of ordered retrievals. Exemplary search, storage and retrieval procedures are described in detail.

INVENTOR.
TSE-YUN FENG

BY [signature]
ATTORNEY

ASSOCIATIVE MEMORY SYSTEM WITH REDUCED REDUNDANCY OF STORED INFORMATION

Detailed Description

TABLE OF CONTENTS

| | Column |
|---|---|
| List of Tables | 2 |
| List of Flow Charts | 2 |
| Glossary of symbols used in the specification and in the drawings | 36 |
| I INTRODUCTION | 5 |
| II AN ASSOCIATIVE MEMORY SYSTEM EMPLOYING AN ASSOCIATIVE PROCESSING UNIT AS A RELATION CUBE | 7 |
| A. Organization | 7 |
| i. Association Register | 7 |
| ii. Interrogation Selector | 7 |
| iii. Basic Associative Memories (BAM's) | 7 |
| iv. Binary Indexing Code Sections | 7 |
| v. Associative Processing Unit (APU) | 7 |
| vi. Match Indicator (MI) | 7 |
| vii. File | 7 |
| B. Functional Operations | 8 |
| i. Storing | 8 |
| ii. Search Operations in BAM | 8 |
| iii. Resolving Multiple Responses and Ordered Retrievals in BAM | 10 |
| iv. Retrieval Operations in System | 11 |
| (a) Screening process | 12 |
| (b) Resolving multiple responses | 13 |
| (c) Ordered retrievals and resolving multiple responses | 14 |
| v. Deleting and Updating | 14 |
| C. Logic Design | 15 |
| i. Match Indicator | 15 |
| ii. BAM | 15 |
| (a) Association register and interrogation selector | 17 |
| (b) Bit structure | 18 |
| (c) Mark bit | 18 |
| (d) Match detector, lock bit and response resolver circuit | 18 |
| (e) Ordered retrieval control circuit | 20 |
| iii. Binary Indexing Code Section | 21 |
| iv. Associative Processing Unit | 22 |
| (a) Interrogation and ordered retrieval control circuit | 22 |
| (b) Bit structure | 22 |
| (c) Match detector section | 22 |
| III THE ASSOCIATIVE MEMORY SYSTEM WITH A RELATION CUBE | 24 |
| A. Organization | 25 |
| i. Interrogation and ORC Circuits, BAM's, Match Indicator and File | 25 |
| ii. Encoder | 25 |
| iii. Relation Cube | 25 |
| B. Functional Operations | 25 |
| i. Storing | 25 |
| ii. Search Operations in BAM | 25 |
| iii. Resolving Multiple Responses and Ordered Retrievals in BAM | 25 |
| iv. Retrieval Operations in System | 25 |
| v. Deleting and Updating | 28 |
| C. Logic Design | 29 |
| i. Relation Cube and Relation Elements | 29 |
| ii. Response Resolving Control Circuit | 30 |
| iii. Response Resolving Control Circuit for the Alternative Algorithm | 31 |
| IV THE ASSOCIATIVE MEMORY SYSTEM WITH MULTI-LEVEL RELATION CUBES (DECOMPOSED CASE) | 32 |
| A. Decomposition of a BAM | 32 |

TABLE OF CONTENTS—Continued

| | Col |
|---|---|
| B. Organization | 32 |
| i. Second-Level BAM's | 32 |
| ii. Second-Level Relation Cube | 33 |
| C. Functional Operations | 33 |
| i. Storing | 33 |
| ii. Search Operations in BAM | 33 |
| iii. Resolving Multiple Responses and Ordered Retrievals in BAM | 33 |
| iv. Retrieval Operations in System | 34 |
| v. Deleting and Updating | 34 |
| D. Logic Design | 34 |
| i. BAM | 34 |
| ii. Interrogation and Ordered Retrieval Control Circuit in BAM | 35 |
| iii. Match Detector and Encoder Sections | 36 |
| iv. First-Level Relation Cube | 36 |

List of Tables

| Table No. | Description | |
|---|---|---|
| 1 | Identification of the contents of the 6 bit operation control code (OPCC) register | 15 |
| 2 | Operation control codes for the various types of searches performed by the invented system | 16 |
| 3 | Truth table for the interrogation bit inputs | 17 |
| 4 | Truth table for relationship between memory bit, interrogation driver and bit mismatch signal | 18 |
| 5 | Truth table for the lock bit and match detector bits | 19 |
| 6 | Truth table for states of match detector and lock bit in complex search | 19 |

List of Flow Charts

| Flow Chart No. | Description | |
|---|---|---|
| 1 | Procedure for ordered retrieval of data elements from a BAM in ascending order of magnitude | 11 |
| 2 | Procedure for search and retrieval of information items matching given search criterion in a multiple match | 12 |
| 3 | Procedure for search and retrieval with screening process | 13 |
| 4 | Procedure illustrating ordered retrieval and multiple match resolution in the system | 14 |
| 5 | Procedure to resolving multiple responses and for ordered retrieval in BAM | 26 |
| 6 | Alternative procedure for resolving multiple responses and for ordered retrieval in BAM | 27 |
| 7 | Procedure for resolving multiple responses and for ordered retrieval of BAM associated with relation cube | 34 |

BACKGROUND OF THE INVENTION

The invention is in the field of associative or content-addressed memory systems which retrieve information on the basis of data content rather than actual location in memory. For example, if an associative memory system contains a bank file made up of information items each consisting of a person's name and a history of his bank transactions, a person's record may be accessed not by the location in memory at which it is stored, but by specifying the name. In this example, the name of an individual would be a descriptor or tag of the information item and would be stored in the associative memory proper while the history of his bank transactions would usually be stored in a secondary memory. In a conventional associative memory each name is stored in full in the associative memory and there is normally some redundancy in the stored information since many names in a large set of names may have identical parts.

Following the example of names, the invented associative memory saves storage space and provides for increased efficiency by storing in one separate associative memory only the first names which are distinct from each other, while storing in a second and a third basic associative memory respectively all middle names which are distinct from each other, and all last names distinct from each other. At the same time the relationships between the names stored in the three basic associative memories are stored in a relation cube in order to allow reconstructing a complete list of all stored names. Duplicates of names which have already been stored are eliminated. Searches, storage and retrieval operation take into account the particular structure of the invented system.

In the prior art, Prywes et al. U.S. Pat. No. 3,388,381 discloses a large-scale memory which behaves like an associative memory but which actually is a specially programmed random access memory. Redundancy of the stored information is reduced to a certain extent by means of special programming of the random access memory, with corresponding increase in access complexity and with corresponding increase in the complexity of searches. The Prywes et al. system is not a true associative memory and may not be manipulated as such.

In Wallin, U.S. Pat. No. 3,405,395, a conventionally organized single-plane associative memory is searched in a conventional bit-column by bit-column search but starting only at the first memory column which has both zero and 1 bits. Thus columns which have only identical information are not searched.

Searches similar in function to the variety of searches performed in the subject invention are disclosed in Joseph et al. U.S. Pat. No. 3,332,069. However, the searches of the Joseph et al. system are performed on a conventionally organized associative memory and the disclosed search procedures would not operate with the invented associative memory.

Winder, U.S. Pat. No. 3,354,436 discloses an associative memory having a special matrix for recording multiple responses to a search and for allowing retrieval of a plurality of responses in certain orders. Again, the multiple response result capability of the Winder system is directed to a conventionally organized associative memory and will not be applicable to the radically different organization of the invented associative memory system.

SUMMARY OF THE INVENTION

The invented associative memory system is organized in a novel manner designed to reduce redundancy of the stored information and to allow flexibility and ease of storage, searches, and retrievals.

The invented system operates with descriptors of information items whose remaining portions are stored in secondary storage. Each descriptor is subdivided into a number of fields, each field storing a data element. The data elements of the same field of all descriptors are stored in a single basic associative memory (BAM) such that the stored data elements are distinct from each other (duplicates of already stored data elements are eliminated). The original relationships between the several data elements of a descriptor are preserved in a relation cube such that the complete descriptor can be reconstructed when desired.

The relationships between the data elements of the several BAM's may be stored in an associative processing unit which behaves functionally like a conventional associative memory but stores shorter codes identifying the data elements of a descriptor instead of storing the complete set of data elements of the descriptor. When storing new information in the invented associative memory, only data elements which are different from those already in a corresponding BAM are stored, but all relationships between the data elements of a new descriptor are stored in the associative processing unit. When searching, a search is made first through the data elements stored in the BAM's. This search is generally more efficient than a corresponding search in a conventional associative memory, because of the lack of redundancy between the data elements of a BAM. In retrieval, a descriptor stored in the BAM's is reconstructed with the help of the codes stored in the associative processing unit. A screening process is provided to allow even faster retrieval of stored descriptors by determining, on the basis of the codes stored in the associative processing unit, which of the matched data elements from the BAM's would not be included in matched descriptors. The invented system has provisions for resolving multiple responses and for ordered retrievals of multiple responses, as well as for suitable deleting and updating of the stored information.

In an alternative embodiment, the function of storing the relationships between the data elements of the descriptors is carried out by a relation cube which is a multidimensional matrix of relation elements and affords further elimination of redundancy of the total amount of stored information. Storage, search and retrieval operations, including ordered retrievals, are carried out with a greater degree of efficiency.

In order to further reduce redundancy in the basic associative memories, one or more of the basic associative memories may be decomposed into second, or third, or fourth, etc.) level basic associative memories. Each of said higher level basic associative memory stores a subfield of the data elements stored in the original first-level basic associative memory. For example, one basic associative memory may be subdivided into two second-level basic associative memories, the first second-level memory storing the first one-third of the data elements of the original basic associative memory, and the second-level basic associative memory storing the remaining two-thirds of the original data elements. The second-level basic associative memories are served by a second-level relation cube for the purpose of reconstructing, from the subfields stored in the second-level memories, the complete data elements originally stored in the first-level basic associative memory. Each of the second-level basic associative memories may be further subdivided into third-level basic associative memories, which in turn are served by a third-level relation cube, etc. Different first-level basic associative memories may be decomposed to different levels.

The principles of the invention may also be applied to an associative memory system using a single basic associative memory and a–F-dimensional relation cube, where F is the number of fields (or data elements) of the descriptors stored in the system. For example, in a dictionary-type use of the system, a single BAM stores the letters of the alphabet, and a F-dimensional relation cube, where F is the length, in letters, of the longest word stored in the system, is used to associate sets of letters into particular words, and to point to other information associated with a word.

I. INTRODUCTION

A conventional associative memory system usually stores a key word of each information item or document stored in the system. The key word, called a descriptor or a tag, is the part of an information item used to identify the item during the search operation. Search operations are performed on the descriptors of information items to distinguish those items which satisfy the search criteria from those that do not.

Figure 1:
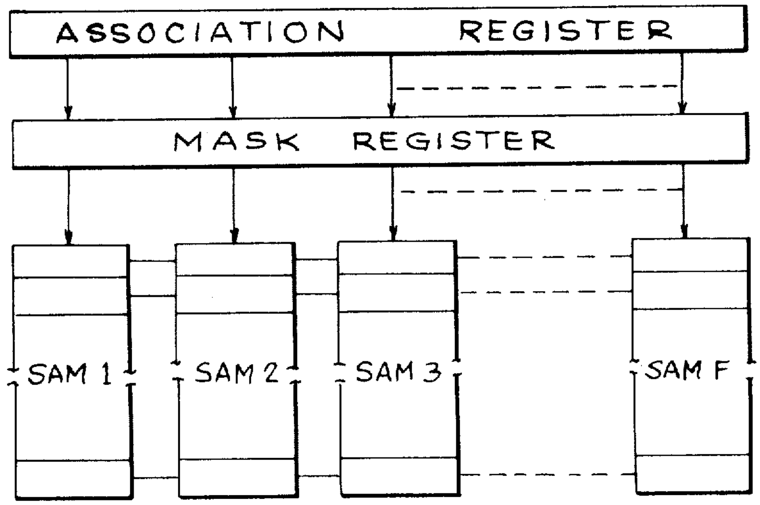
Fig. 1. (PRIOR ART)
FIG. 1 is a block diagram of an illustrative prior art associative memory system.
Figure 2:
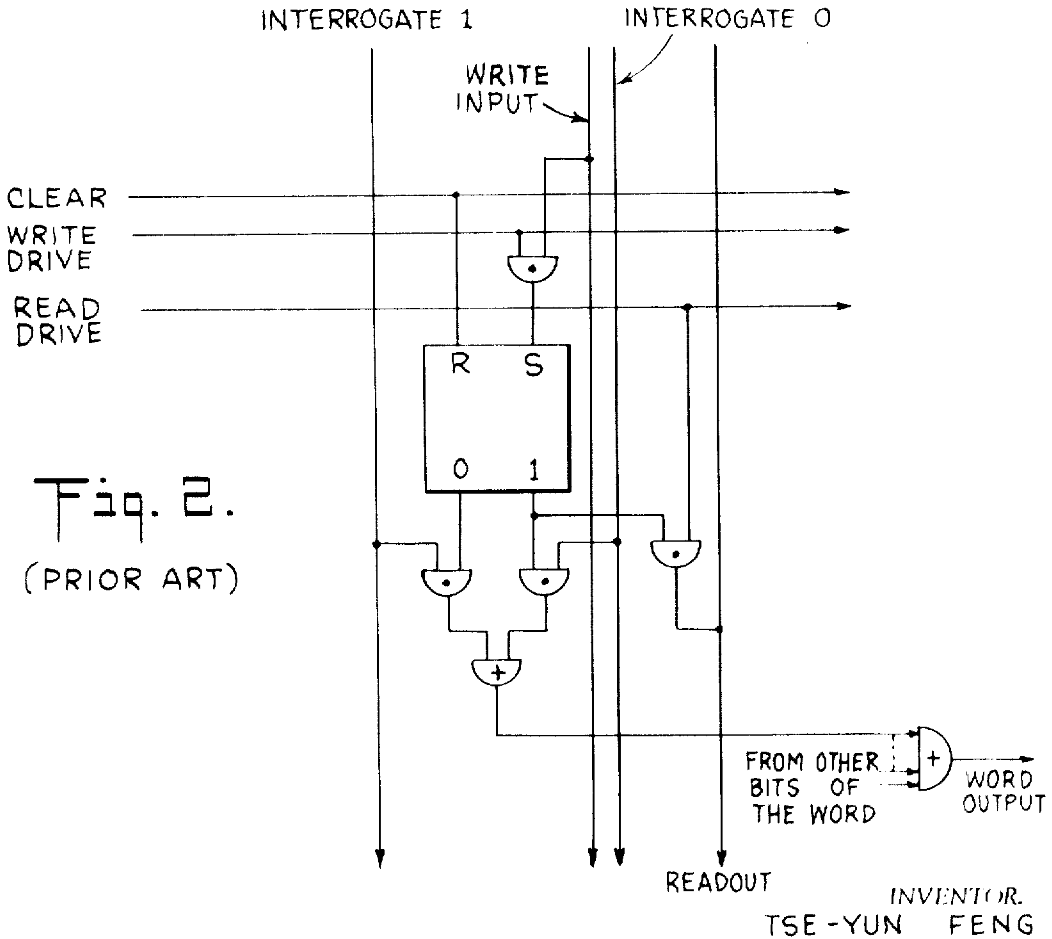
Fig. 2. (PRIOR ART)
FIG. 2 is a block diagram of an associative memory cell of the prior art which may be used for storing bits of information in the invented system.

A descriptor usually consists of several different types of information, each of them called a data element. A data element is usually the smallest complete information unit which characterizes the information item stored in the system. For instance, in a library catalog file, a data element of a descriptor of an information item may be the name of the author, or the name of the publisher, or the year of publication, or the field of interest of the book. The partitioning of a descriptor into data elements is according to the different attributes which those data elements possess. It should be noted that only descriptors are stored in the associative memory, while the associated documents are all stored in some secondary storage units. Identification of an information item in the associative memory leads to the location of the document which should be retrieved. In the associative memory, the data elements of the same attribute form a "field" and they are stored in the same bit positions in the memory. We shall call these bit positions occupied by the data elements of the same attribute a subassociative memory (SAM). Thus, data elements of different attributes are stored in different SAM's. To form complete descriptors for all the information items, these different SAM's may be connected together as shown in FIG. 1. Each bit of a data element may be stored in a storage device of the type shown in FIG. 2. FIGS. 1 and 2 are illustrative of prior art associative memories.

To carry out a search operation in this system, the association criterion and mask values are stored in the association register and mask register, respectively. Interrogation drives (not shown in FIG. 1) compare the association criterion with the descriptors stored in the memory. Any descriptor with any of its data elements mismatching the association criterion disqualifies its associated document as a desired item. If more than one descriptor matches the association criterion, algorithms for resolving of multiple responses or ordered retrieval are employed to retrieve desired information items one at a time in sequence (or in order).

Let us consider one particular SAM of the memory shown in FIG. 1. The data elements stored in the SAM are often not distinct ones, i.e., exactly the same data element could be stored more than once in different descriptors. Consider, for example, an associative memory which stores the information of a book catalog and a SAM is used to store the years of publications. For 1 million books published since 1470, there are only 500 distinct data elements in the SAM. This is redundancy of 99.95 percent.

Since the descriptor of an information item may be considered to consist of a number of data elements and their relations, it is conceivable that with appropriate relation arrangement the redundancy may be eliminated or at least decreased.

An associative memory may be constructed with a number of basic associative memories (BAM's) where only distinct data elements are stored, and the descriptor of a document is formed by connecting its data elements together according to their relations.

A new associative memory system of this type may be organized with F BAM's (basic associative memories) and an F-dimensional relation cube. The BAM's store the distinct data elements and the F-dimensional relation cube establishes the relationships among data elements of different fields. In retrieving an information item from the system, the search operations are primarily in the BAM's. When the data elements constituting the descriptor of an interrogation item are identified in every BAM, through the relation cube the desired information item is located and retrieved.

Figure 3:
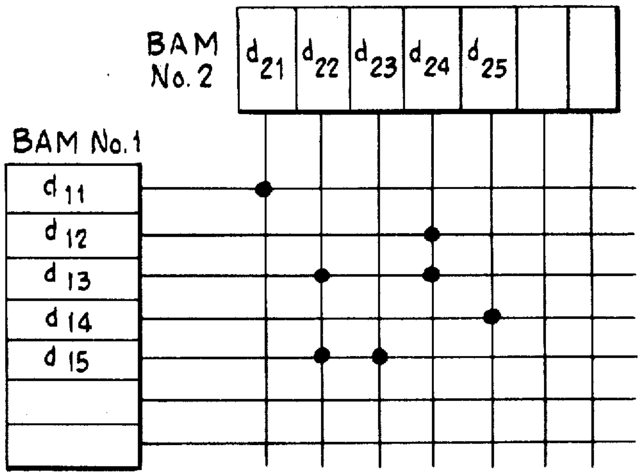
FIG. 3 is a block diagram illustrating a two-dimensional example of basic associative memories and a relation cube.

A two-dimensional relation cube showing the association of data elements of two different fields is shown in FIG. 3. Field 1 is stored in BAM No. 1 which contains data elements *d*11, *d*12, *d*13, *d*14 and *d*15, all distinct from each other and field 2 is stored in BAM No. 2 which contains data elements *d*21, *d*22, *d*23, *d*24, *d*25, all distinct from each other. The dots in FIG. 3 represent the existing relationships between two data elements. From this it is clear that descriptors *d*11*d*21, *d*12*d*24,*d*13,*d*22, *d*13*d*24, *d*14*d*25, *d*15*d*22, and *d*15*d*23 are stored in the system.

As noted, a data element stored in a BAM must be part of the descriptor of some information item. If a data element does not have any dot on its line, it should be deleted automatically. This usually results from the deletion of some information item which used to contain this data element.

Each BAM in the system contains a dummy element, to identify any unspecified data element of an information item. This dummy data element makes every document have a completely specified descriptor. It should be noted that the use of this dummy data element is different from that of mask. When we search for some information items with one or more fields masked, we "don't care" what they have in the masked fields as long as the rest of the descriptor fulfills the association criterion. But an information item with a dummy data element in some field is always a distinct item.

Within the relation cube, certain kinds of relation elements must be provided to associate two or more data elements to form a descriptor of an information item. The relation elements are also used to set the match condition of data elements during interrogation.

In general, each data element is not related to all data elements in other fields. Eventually, only a small portion of the data elements are related to one another, especially in large memories. A great deal of relation elements can be saved if relation elements are placed only in the spots where two lines (in a two-dimensional case as in FIG. 3) representing two data elements of two BAM's are connected. The total number of relation elements required would be equal to the maximum number of the stored descriptors. This number is usually much less than the number of total possible combinations of data elements from all fields.

As a result, it is desired that the relation element should be so built that it can be used by any information item. Naturally, when one relation element is occupied by an information item, it is fixed until the information item is deleted.

II. AN ASSOCIATIVE MEMORY SYSTEM EMPLOYING AN ASSOCIATIVE PROCESSING UNIT AS A RELATION CUBE

Figure 4:
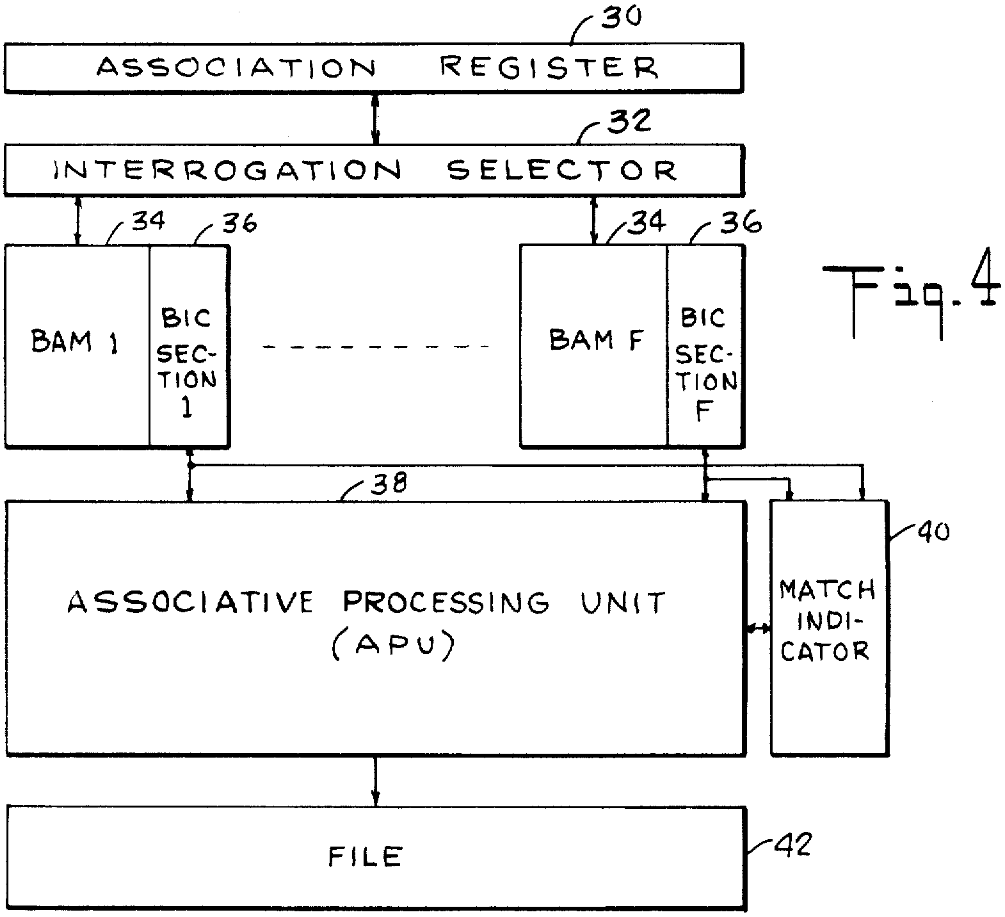
FIG. 4 is a block diagram of an embodiment of the invented system including a plurality of basic associative memories, an association processing unit serving as a relation cube, and access means.

In this embodiment of the invented system, the relationships among the data elements of different fields are established by an associative processing unit (APU) which serves as the relation cube. It stores indexing codes of data elements, which indexing codes are used to represent distinct data elements within each field. A block diagram of this embodiment of the invented system is shown in FIG. 4.

A. Organization i. The association register 30 stores the interrogation word or the descriptor which is to be stored. The contents of this register are compared with data elements in the BAM's during interrogation. This register may also be used as the output buffer. When some data element is read out from a BAM, it is stored temporarily in this register 30.

ii. The interrogation selector 32 is used to control the sequence and the bit position of interrogations. Only the bit position with a value 1 in the corresponding bit of this selector 32 is to be interrogated.

iii. Basic Associative Memories (BAM)

There are F (the number of different fields) basic associative memories 34 storing only distinct data elements. The individual BAM's 34 may be identical in every other respect, but may have different dimensions. The sequential order of these BAM's is not essential, but for convenience we label them as BAM 1, BAM 2, ..., BAM F as shown.

iv. Binary Indexing Code Sections

For each BAM 34 there is a binary indexing code section 36 associated with it. A binary indexing code (BIC) is assigned to each data element as the medium of connecting F data elements of an information item. It is evident that for $m$ words:

$$2^q \geq m > 2^{q-1}$$

where $q$ is the number of bits of the binary indexing code BIC.

v. Associative Processing Unit (APU)

The associative processing unit 38 is itself an associative memory. It has F sections, each of which corresponds to a BAM 34. It stores the binary indexing codes of data elements in such a way that each word in the APU 38 represents a coded descriptor for an information item. Searched information items are identified in the APU 38 after the composing data elements are identified in the BAM's 34.

vi. Match Indicator (MI)

The match indicator 40 is shared by all BAM's 34 and the APU 38. It is used to test if the number of responsed is zero, one, or more than one.

vii. File

The file 42 stores the descriptive data of information items. Usually the file is in secondary storage using tapes, disks, microfilms, or the like.

In the configuration shown in FIG. 4, the redundancy of data element storage is not totally eliminated, because binary indexing codes BIC may still appear repeatedly in the APU 38. However, the system of FIG. 4 is still advantageous to reduce memory space requirements when the ratio of the length of data elements to that of the binary indexing codes BIC is large. Moreover, using an APU 38 which is itself an associative memory as the relation cube is more flexible for information storage and search processing.

From another point of view, the APU 38 may be seen as the large memory, and the BAM's 34 together with their binary indexing code sections 36 as index dictionaries. Every time new information is being stored in the memory, the data elements of its descriptor will first be looked up in the corresponding dictionaries (BAM's). If it is a new data element, it is stored in a particular BAM and a BIC number is assigned to it. After all data elements of an information item get their indices (BIC's), these combined indices are the identification number of an information item and will be stored in the APU. When certain information is being searched for, the indices of the elements must be found in the BAM's 34 first, followed by a search of these indices in the APU 38.

B. Functional Operations i. Storing

The store operation always begins with the comparisons of the data elements of the new information item (or descriptor) with all the existing data elements stored in each BAM 34. If a data element is already stored in a BAM 34, its BIC numbers are stored in the corresponding section of the first available descriptor space in the APU 38. Otherwise, the new data element is stored in the first available space in the corresponding BAM 34 and then its BIC number is stored in the APU 38. After repeating the same procedure for all of the F BAM's 34, the descriptive data of the item is sent into the file as a permanent record until it is deleted or updated at a later time.

ii. Search Operations in BAM

In the following description, a mnemonic is given to each search operation. The symbol (B) accompanying the mnemonic is the reference interrogation criterion. For Similar-To search, the mask condition D is predetermined and the symbol (B,D) is used. For searches involving two reference words, the symbol (B1,B2) is used. The mask condition is expressed in a vector form: $D=(d1,d2,...,dn)$ where $n$ is the number of bits in the BAM and $dj=0$ means that the $j$th bit is masked during interrogation.

a. Equal-To Search EQU(B)

Equal-To search locates the data element with exactly the same information as B. At most one data element responds. Mask: $D=(1, 1, ..., 1)$.

b. Not-Equal-To Search NEQ (B)

Not-Equal-To search is always accomplished by complementing the result of EQU(B). Usually, more than one data element responds.

Mask: $D=(1, 1, ..., 1)$ c. Similar-To Search SMT (B,$D$)

Any data element having exactly the same information as B in the unmasked bit positions ($dj=1$) will respond. More than one data element may respond.

Mask: $D$ is as specified in the search instruction.

d. Proximate-To Search PXT (B)

This search is not defined for this embodiment of the invention.

e. Greater-than Search GTH(B)

Any data element with its numerical value greater than B will respond. More than one data element may respond.

Mask condition is varied at each cycle time. Only one bit is interrogated at a time. With the most significant bit at the leftmost bit position, the search is from left to right.

f. Greater-Than-Or-Equal-To GOE(B)

Any data element with its numerical value greater than or equal to B will respond. More than one data element may respond.

Mask condition is the same as GTH.

g. Smaller-Than Search STH(B)

Any data element with its numerical value smaller than B will respond. This search is accomplished by complementing the result of GOE(B). More than one data element may respond.

h. Smaller-Than-Or-Equal-To Search SOE(B)

Any data element with its numerical value smaller than or equal to B will respond. This search is accomplished by complementing the result of GTH(B). More than one data element may respond.

i. Between-Limits Searches

There are four types of between-limits searches.

Type A BLA(B1,B2)

The data elements with numerical values between B1 and B2 inclusively are located. This search is achieved by performing on the entire memory SOE(B1) which his essentially the complement of GTH(B1) and then GOE(B2) on those data elements which responded in SOE(*b*1). More than one data element may respond.

Type B BLB(B1,B2)

This search locates the data elements with numerical values between B1 and B2 (exclusively) or equal to B1. As BLA, BLB requires two consecutive searches, the first search, SOE(B1), is performed upon the entire memory and the second one, GTH(B2), is applied to those data elements responded in SOE(B1). More than one data element may respond.

Type C BLC(B1,B2)

This search is similar to that of Type B. It locates the data elements with numerical values between B1 and B2 (exclusively) or equal to B2. The first search, STH(B1), is performed upon the entire memory and then GOE(B2) is applied to the responded data elements. More than one data element may respond.

Type D BLD (B1,B2)

This search locates the data elements with numerical values between B1 and B2 exclusively. The first search STH(B1) is performed on the entire memory and the second one, GTH(B2) is applied to the data elements which have responded. More than one data element may respond.

j. Not-Between-Limits Searches

Type A NBA (B1,B2)

Any data element with its numerical value greater than B1 or smaller than B2 responds to this search. It is achieved by complementing the result of BLA (B1,B2). More than one data element may respond.

Type B NBB (B1,B2)

Any data element with its numerical value greater than B1, smaller than B2, or equal to B2 responds to this search. It is achieved by complementing the result of BLB (B1,B2). More than one data element may respond.

Type C NBC (B1,B2)

Similar to Type B, any data element with its numerical value greater than B1, equal to B1, or smaller than B2 responds to this search. It is achieved by complementing the result of BLC (B1,B2). More than one data element may respond.

Type D NBD (B1,B2)

Any data element with its numerical value greater than B1, equal to B1, smaller than B2, or equal to B2 responds to this search. It is achieved by complementing the result of BLD (B1,B2). More than one data element may respond.

k. Greatest Search GST

This search locates the data element having the greatest numerical value among the data elements being searched. It is achieved by the ordered retrieval in descending order which is discussed later in this specification. If the memory being searched is not empty, there is always one data element responding to this search.

1. Smallest Search SST

Similar to GST search, this search is achieved by ordered retrieval in ascending order. There is always a data element responding to the search if the memory is not empty.

m. Nearest-Above Search NRA(*b*)

This search is achieved by two consecutive searches. The first search is GTH(B) performed upon the entire memory and then SST is performed upon those responded to GTH(B). At most one data elements responds but there might be no response.

n. Nearest-Below Search NRB(B)

This search is also achieved by two consecutive searches. The first search is STH(B) performed upon the entire memory and the second one GST is performed upon those responded to STH(B). There is either one or no response.

o. Greatest-in-A-Range Searches

Type A GGA(B1,B2)

This search is used to locate the data element with its numerical value being the greatest among those of numerical values between B1 and B2 inclusively. The first search performed on the entire memory is BLA(B1,B2) which is essentially SOE(B1) and GOE(B2). Then the second operation GST is performed upon the responded data elements. At most one data element responds.

Type B GGB(B1,B2)

This search is similar to GGA except the range is different. It is achieved by first performing BLB(B1,B2) and then GST. There is either one or no response.

Type C GGC(B1,B2)

This search locates the greatest data element in the range (B1,B2). It is achieved by first performing BLC(B1,B2) and then GST. At most one data element responds.

Type D GGD(B1,B2)

This type of Greatest-In-A-Range search locates the data element with greatest numerical value in the range between B1 and B2 exclusively. At most one response may occur.

p. Smallest-In-A-Range Searches

There are also four types of Smallest-In-A-Range searches. They differ from Greatest-In-A-Range searches only in having the least data element retrieved instead of the greatest one.

Type A SGA(B1,B2)

Type B SGB(B1,B2)

Type C SGC(B1,B2)

Type D SGD(B1,B2)

iii. Resolving Multiple Responses and Ordered Retrievals in BAM

Searches like Not-Equal-To, Similar-To, Greater-Than, etc. usually give more than one response to a BAM 34. During such searches matched data elements from one BAM 34 are examined by comparing their binary indexing codes with the BIC's stored in the APU 38, one at a time. So, in order to sort the matched data elements from a BAM 34, a sequencing response resolver can be used to retrieve the uppermost unchosen matched data element and skip the mismatched or matched-but-chosen data element.

The invented system uses a particular technique to retrieve matched data elements in either ascending or descending order according to the numerical values of the stored data element. The invented technique involves left-to-right interrogation in a serial-by-bit mode and can be carried out by means of a column-pair sensing arrangement such as described in "Retrieval of Ordered List From A Content Addressed Memory" by M. H. Lewin, RCA Review, June 1962, pages 215–229.

By using two column sense wires to test each bit position the following four states of contents of the matched data elements are possible:

a. State 0: all data elements have 0 in this bit position;

b. State 1: all data elements have 1 in this bit position;

c. State X: some of the data elements have 0 and others have 1 in this bit position;

d. State Y: no data element is selected In the invented technique, there are two kinds of interrogations at each bit position, namely: column sense interrogation and select interrogation.

The column sense interrogation gives the column sense output which determines the position of the next bit interrogation. If the column sense output is either 0 or 1, the next bit interrogation is performed at the following bit position. Otherwise, if it is X, the select interrogation is performed at the same bit position. Following each retrieval the interrogation process starts one again from the leftmost bit.

The invented technique for ordered retrieval in ascending order can best be described by the following flow chart. For ordered retrieval in descending order, 0 and 1 are interchanged in assigning values of *bj*.

Note: in the following flow chart, the symbol "←" means "replaced by."

Flow Chart No. 1

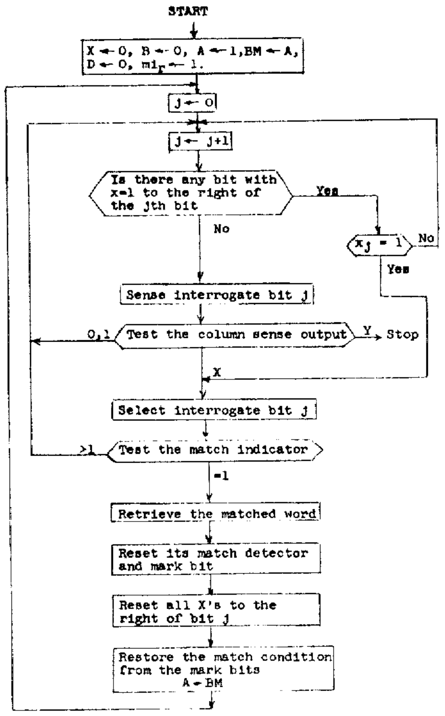

iv. Retrieval Operations in System

After searching the BAM's 34 successfully, the search continues in the APU 38. For single response in a BAM 34, the BIC number of the matched data element is sent into the APU 38 and compared with correspondingly located BIC numbers stored there. For multiple responses in a BAM 34, either a response resolver is used to sort out data element one at a time, or the invented technique described above is used to retrieve them in a specific order. Thus, information items satisfying the search in one BAM 34 are located in the APU 38.

Since there are F different BAM's 34, with various operations in each of them, the logical relation among them must be considered. In most cases the logical connectives among the data elements of a single information item are AND relation. However, OR and COMPLEMENT may also in some cases be involved in the logical relations among searchers in BAM's 34. The general steps for performing a retrieval operation in the invented system can be illustrated best by the following flow chart Flow Chart No. 2

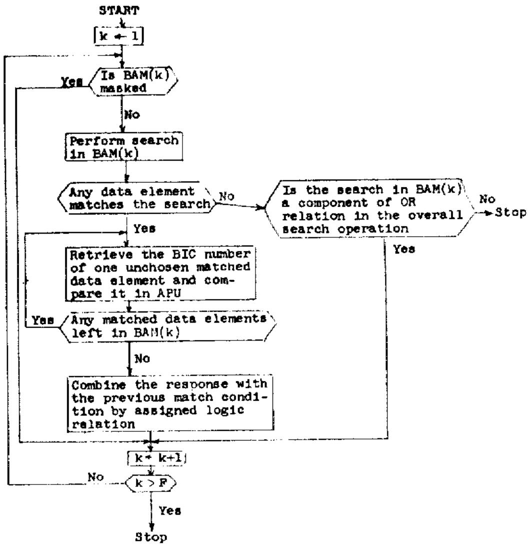

a. Screening process

In performing the search operations in the invented system as described above, some time is wasted in comparing in the APU 38 the binary indexing code of a matched data element which is eventually not included in any of the matched information items. The two-dimensional relation cube of FIG. 3 can be used to illustrate this. Suppose only *d*13 matches the search performed in BAM No. 1 and *d*21, i d22 and *d*23 match the search performed in BAM No. 2. If we follow the procedure described in the flow chart of the preceding section (iii) we would have to test *d*21, *d*22 and *d*23 in the APU 38 after *d*13 is searched in the APU 38. Among these tests only *d*22 brings us a desirable result, *d*13*d*22. Time for searching for *d*21 and *d*23 is wasted because they do not belong to any matched item.

A screening process, described below, has been developed with the use of the invented procedure to locate information items in shorter time.

Searches to which at most one information item or data element is expected to respond are defined at point searches, and the others which cover a certain range of information items or data elements are defined as line searches. Point searches include "Equal-to, " "Greatest," "Smallest," "-Nearest-Above," "Nearest-below," etc. Line searchers include "Not-Equal-To," "Greater-Than," "Between-Limits," etc. A masked interrogation usually results in multiple responses, so it is categorized as a line search.

Since point searches can have at most one matches data element, the screening process described below is not required for them. It is performed only for line searches.

A mark bit is used for every word (of F sections) in the APU 38 to store the select condition of that word. Before any interrogation, all words stored in the APU 38 are considered to be selected (with the mark bit equal to 1) and in match condition (with the match detector in state 1). After each interrogation performed in the APU, the select condition is determined by the present match condition. Any interrogation thereafter is performed only upon the selected words.

In a search operation, all the point searches are performed first. Before a line search is performed in a BAM 34 the selection condition is transmitted back to the BAM. A mark bit is also provided for every word in the BAM to store the select condition. Unselected data elements are not affected and are never matched words. Thus, the number of matched data elements is decreased by screening those data elements which may match the search criterion but are not selected.

The transfer of the select condition from the APU 38 to the BAM 34 is achieved by using the new procedure described below and a decoder which is included in the code section of every BAM 34. Each time the code number (in one section of the APU 38) of a selected word is determined according to the procedure described below, it is decoded by the decoder to identify and mark its corresponding data element. The procedure is illustrated best by the following flow chart of a search operation in the system with screening process.

Flow Chart No. 3

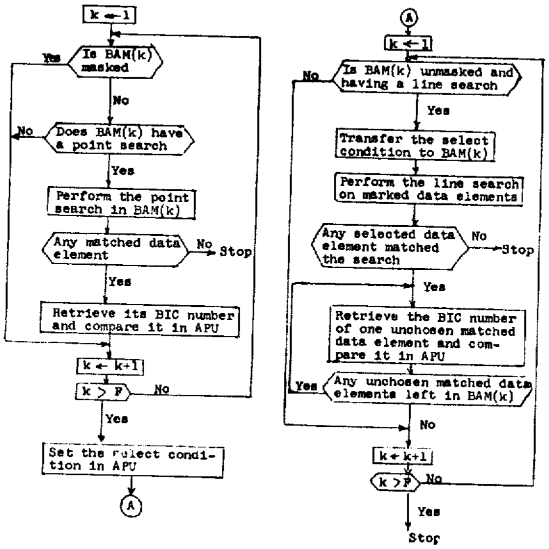

It should be noted that the screening process of the above flow chart is applied only to searches related by logical AND relations between the data elements of an information item, and it would be of particular advantage only when a small number of data elements is expected from the matched information items but a large number of data elements responded to the search. In particular, advantages derive when the number of responses to a line search is greater than the sum of twice the number of the elements selected by the screening process above plus the number of selected and matched data elements.

b. Resolving multiple responses

When all BAM's 34 have been searched according to search criteria, the match condition in the APU 38 indicates which information items are to be retrieved. If more than one item matches the overall search, the retrieval may be sequential, but it would be impractical to use a sequential scanning scheme to retrieve multiple items in a very large memory.

A new procedure, described below, may be used for ordered retrieval performed on the matched items. The new procedure is applied only to those sections where more than one coded data element is in the matched items. This is because in sections where only one distinct code number is compared all bits are skipped at each cycle. The interflowing signals pass these sections without going through every bit.

c. Ordered retrievals and resolving multiple responses

Sometimes matched information items are required to be retrieved according to a special order imposed on the matched data elements of one particular BAM 34; then ordered retrieval with resolving multiple responses is desired. A combined procedure may be employed:

α. Perform search operation for (F−1) BAM's as described in section (iv). The Fth BAM 34 is the one with ordered retrieval.

β. Perform search operation in the Fth BAM 34 with ordered retrieval.

γ. Retrieve one unchosen matched data element from this BAM 34 according to the order.

δ. Compare its code number in the APU 34 and combine its match condition with the match condition of searches of (F−1) BAM's 34.

ε. Resolving multiple responses from the APU 38.

ζ. Repeat steps (γ) through (ε) until all matched data elements are sorted and responded items are retrieved.

If we let BAM(I) be the BAM 34 with a line search and requiring ordered retrieval, the retrieval operation is illustrated in the following chart:

Flow Chart No. 4

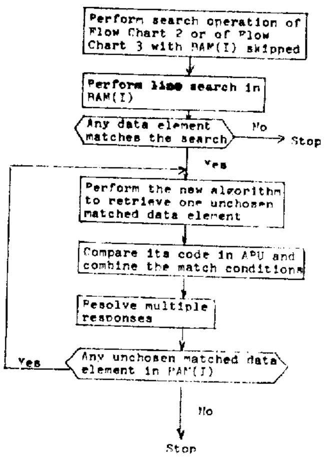

v. Deleting and Updating

Deleting an information item from the invented system begins with the same procedure as an "Equal-To" search. All BAM's 34 are interrogated in a serial-by-BAM mode. The BIC number of the matched data element is compared with those stored in the APU 38. A match indicator is used to detect the number of responses in the APU 38 to the matched data elements. If no response, the matched data element is deleted immediately because it is trivially stored in the BAM 34. If one response, the corresponding BAM 34 is marked for later operation. In the case of multiple responses no action is taken. After all BAM's 34 have been interrogated and the item is found in the systems, the item is deleted. In those BAM's 34 which were marked, the data element is deleted also. Because those data elements were possessed only by the just-deleted item, after it is deleted these data elements are trivially stored in their BAM's 34. In case the information item is not found in the system, no action is required.

Updating of information items can be achieved by directly writing the new information into the memory position(s). Clearing before writing is not necessary.

C. Logic Design

The symbols used in the descriptions and the drawing of the logic circuits discussed below are defined in the Glossary of Symbols at the beginning of the Detailed Description.

i. Match Indicator—FIGS. 5, 6 and 7

Figure 5:
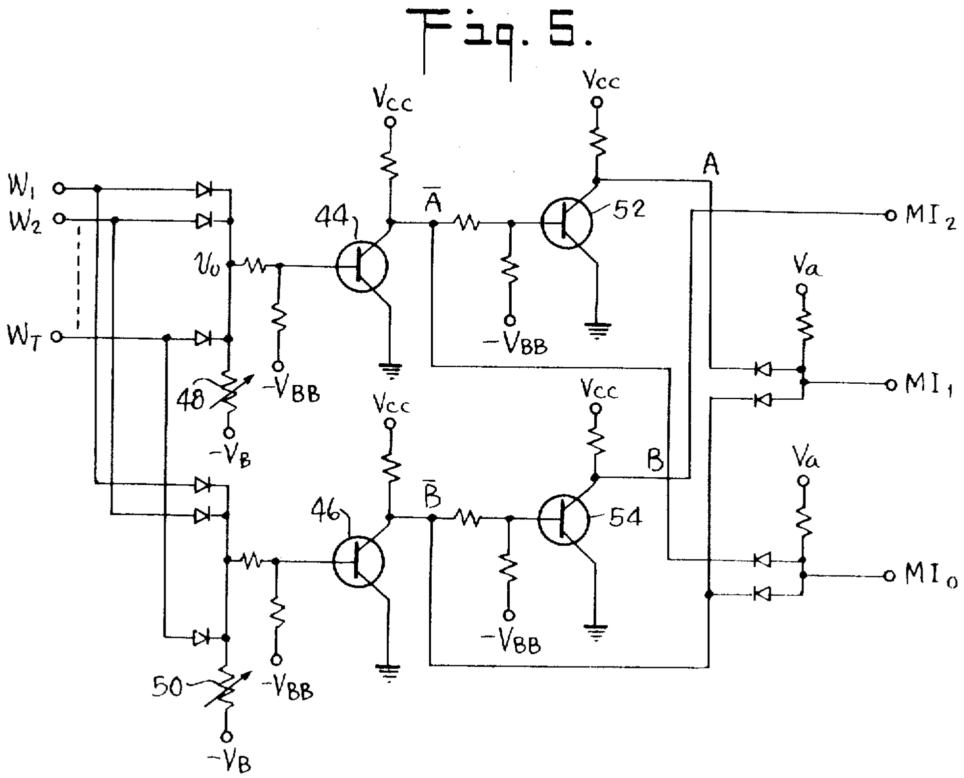
FIG. 5 is a diagram of a match indicator circuit which operates in the ternary mode to indicate if a search criterion has found no matches, one match, or more than one match.

The match indicator of FIG. 5 is used to test the number of matched words in each BAM 34 or in the APU 38 to be zero, one, or more than one. Unlike a counter, the match indicator of FIG. 5 tests all the inputs and gives one of three possible match states. As shown in FIG. 5, transistors 44 and 46 may be considered as threshold gates. The threshold values are adjusted by the series resistors 48 and 50. The remaining resistors and the diodes shown in FIG. 5 are standard elements serving in their usual functions to permit ternary operation of the circuit. Transistors 52 and 54 are for inversion and amplification purposes.

The outputs of the circuit of FIG. 5 are then given by $$MI_0=\bar{A}\cdot\bar{B} \text{ (no response)}$$

$$MI_1=A\cdot\bar{B} \text{ (single response)}$$

$$MI_2=B \text{ (multiple responses)}$$

Figure 6:
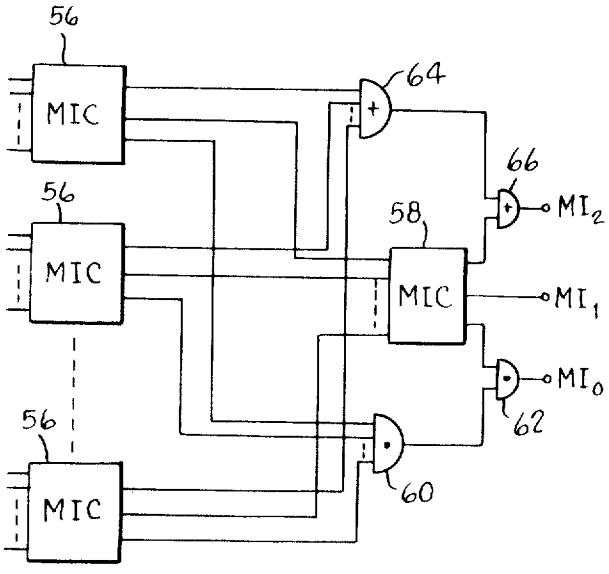
FIG. 6 is a block diagram showing a two-level match indicator in which each match indicator circuit is the circuit shown in FIG. 5.

For a large number of inputs a multilevel match indicator network can be constructed. An example of a two-level network is shown in FIG. 6, in which each of the first-level MIC's 56 and the second-level MIC 58 may be of the structure of the MIC shown in FIG. 5. The AND-gates 60 and 62 and the OR-gates 64 and 66 are used to carry out the shown logical operations.

Figure 7:
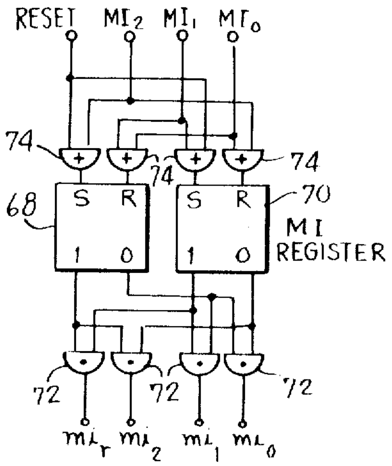
FIG. 7 is a block diagram of a match indicator register for storing the outputs of match indicator circuits.

The outputs of the indicator (whether it is the single-level MIC of FIG. 5 or the multilevel MIC of FIG. 6) may be stored in the two-bit MI register of the type shown in FIG. 7. The MI register of FIG. 7 is set into appropriate state either (1) after each interrogation in ordered retrieval operation or (2) at the end of a search operation performed in a BAM 34. The SR flip-flop of the match indicator of FIG. 7 is always in reset state ($mi_r$=1) at the beginning of a search operation. It is also reset after a matched data element is read out in an ordered retrieval. Flip-flop 70 is similar to flip-flop 68; and the standard construction AND-gates 72 and OR-gates 74 carry out the logical functions indicated in FIG. 7.

ii. BAM (basic associative memory)

In each BAM 34 there is a six-bit operation control code (OPCC) register. The contents of this register are used to control various search or retrieval operations and are defined in the table shown below. A list of OPCC designations of all search and retrieval operations is given in the table following the table below.

TABLE NO. 1

| Bit | Name | Output | Meaning |
|---|---|---|---|
| 1 | EQ | *eq* | Equal-To search |
| 2 | GT | *gt* | Greater-Than search |
| 3 | CM | *cm* | Complementation |
| 4 | OR | *or* | Ordered retrieval |
| 5 | DO | *do* | Type of ordered retrieval* |
| 6 | XM | *xm* | Extremum search |

*$do$ = 1 for descending order.

Only one OPCC designation is provided for each search operation except those involving the between-limits and neighboring-word searches which, in our system, can be achieved only through logic operations between other searches. For example, a "Between-Limits Type A" search is implemented by performing SOE first, followed by GOE. The result of SOE and GOE are ANDed together by performing GOE upon the responded words of SOE to give the desired solution.

TABLE NO. 2

| Bits | 1 | 2 | 3 | 4 | 5 | 6 |
|---|---|---|---|---|---|---|
| Operations | EQ | GT | CM | OR | DO | XM |
| EQU | 1 | 0 | 0 | 0 | 0 | 0 |
| NEQ | 1 | 0 | 1 | 0 | 0 | 0 |
| SMT | 1 | 0 | 0 | 0 | 0 | 0 |
| GTH | 0 | 1 | 0 | 0 | 0 | 0 |
| GOE | 1 | 1 | 0 | 0 | 0 | 0 |
| STH | 1 | 1 | 1 | 0 | 0 | 0 |
| SOE | 0 | 1 | 1 | 0 | 0 | 0 |
| BLA | 0 | 1 | 1 | 0 | 0 | 0 |
| | 1 | 1 | 0 | 0 | 0 | 0 |
| BLB | 0 | 1 | 1 | 0 | 0 | 0 |
| | 0 | 1 | 0 | 0 | 0 | 0 |
| BLC | 1 | 1 | 1 | 0 | 0 | 0 |
| | 1 | 1 | 0 | 0 | 0 | |
| BLD | 1 | 1 | 1 | 0 | 0 | 0 |
| | 0 | 1 | 0 | 0 | 0 | 0 |
| NBA | 0 | 1 | 0 | 0 | 0 | 0 |
| | 0 | 0 | 1 | 0 | 0 | 0 |
| NBB | 0 | 1 | 1 | 0 | 0 | 0 |
| | 0 | 1 | 0 | 0 | 0 | 0 |
| | 0 | 0 | 1 | 0 | 0 | 0 |
| NBC | 1 | 1 | 1 | 0 | 0 | 0 |
| | 1 | 1 | 0 | 0 | 0 | 0 |
| | 0 | 0 | 1 | 0 | 0 | 0 |
| NBD | 1 | 1 | 1 | 0 | 0 | 0 |
| | 0 | 1 | 0 | 0 | 0 | 0 |
| | 0 | 0 | 1 | 0 | 0 | 0 |
| GST | 0 | 0 | 0 | 1 | 1 | 1 |
| SST | 0 | 0 | 0 | 1 | 0 | 1 |
| NRA | 0 | 1 | 0 | 0 | 0 | 0 |
| | 0 | 0 | 0 | 1 | 0 | 1 |
| NRB | 1 | 1 | 1 | 0 | 0 | 0 |
| | 0 | 0 | 0 | 1 | 1 | 1 |
| GGA | 0 | 1 | 1 | 0 | 0 | 0 |
| | 1 | 1 | 0 | 0 | 0 | 0 |
| | 0 | 0 | 0 | 1 | 1 | 1 |
| GGB | 0 | 1 | 1 | 0 | 0 | 0 |
| | 0 | 1 | 0 | 0 | 0 | 0 |
| | 0 | 0 | 0 | 1 | 1 | 1 |
| GGC | 1 | 1 | 1 | 0 | 0 | 0 |
| | 1 | 1 | 0 | 0 | 0 | 0 |
| | 0 | 0 | 0 | 1 | 1 | 1 |
| GGD | 1 | 1 | 1 | 0 | 0 | 0 |
| | 0 | 1 | 0 | 0 | 0 | 0 |
| | 0 | 0 | 0 | 1 | 1 | 1 |
| SGA | 0 | 1 | 1 | 0 | 0 | 0 |
| | 1 | 1 | 0 | 0 | 0 | 0 |
| | 0 | 0 | 0 | 1 | 0 | 1 |
| SGB | 0 | 1 | 1 | 0 | 0 | 0 |
| | 0 | 1 | 0 | 0 | 0 | 0 |
| | 0 | 0 | 0 | 1 | 0 | 1 |
| SGC | 1 | 1 | 1 | 0 | 0 | 0 |
| | 1 | 1 | 0 | 0 | 0 | 0 |
| | 0 | 0 | 0 | 1 | 0 | 1 |
| SGD | 1 | 1 | 1 | 0 | 0 | 0 |
| | 0 | 1 | 0 | 0 | 0 | 0 |
| | 0 | 0 | 0 | 1 | 0 | 1 |
| ORA* | 0 | 0 | 0 | 1 | 0 | 0 |
| ORD** | 0 | 0 | 0 | 1 | 1 | 0 |

*ORA: Ordered retrieval in ascending order.
**ORD: Ordered retrieval in descending order.

a. Association register and interrogation selector—FIG. 8.

Figure 8:
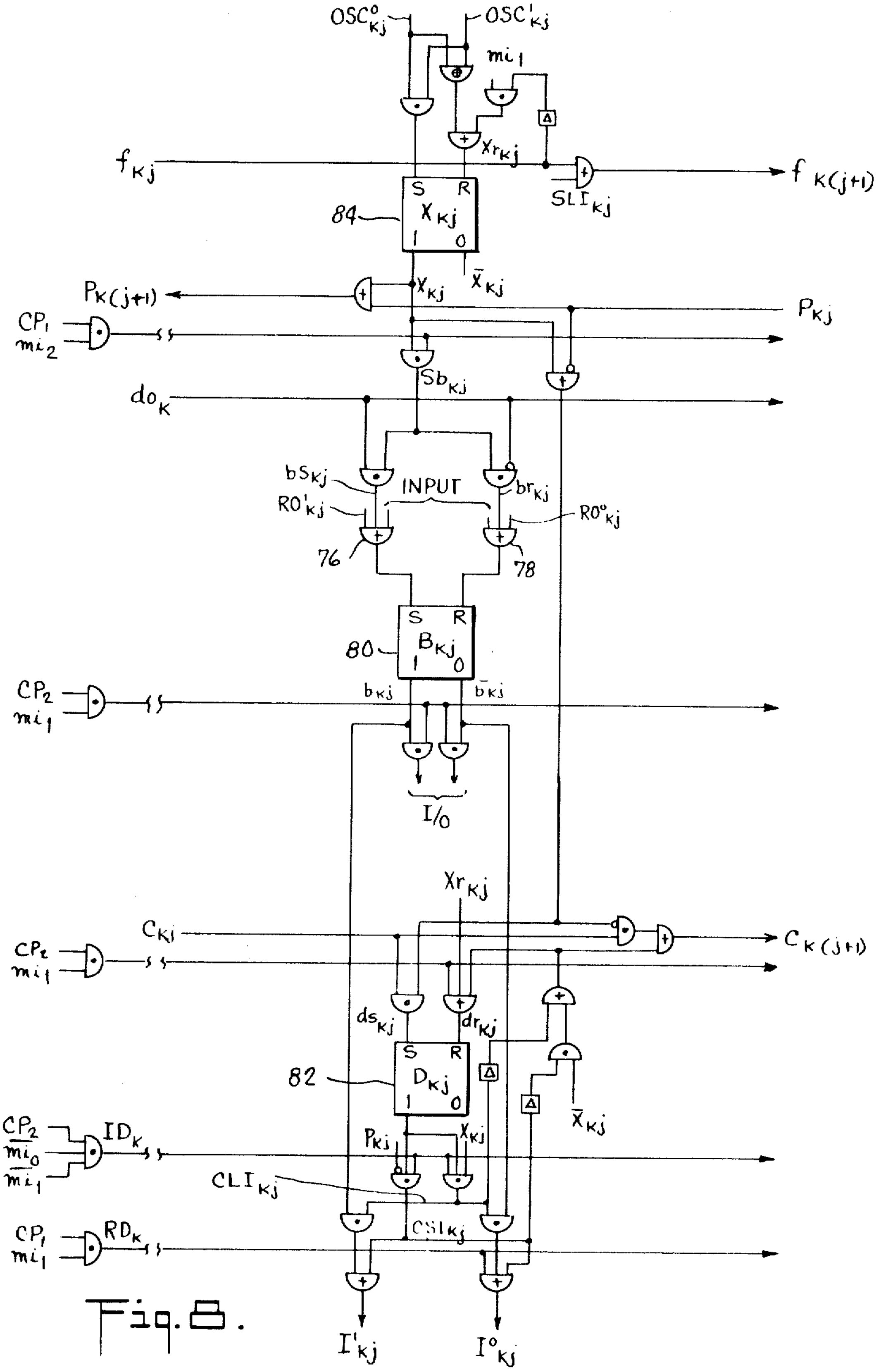
FIG. 8 is a block diagram of an ordered retrieval control circuit for the *j*th bit of a basic associative memory (the *k*th BAM).

The association register 80 and interrogation selector 82 of FIG. 8, in which the circuit for the $j$th bit of a single BAM 34 is shown, serve as the input unit of a BAM. Three different inputs to the association register are ORed together by OR-gates 76 and 78 to determine the contents of the association register 80. The first input is either the interrogation criterion or the information to be stored into the BAM 34; it is loaded into the association register 80 through the lines labeled "input." The second input to the association register 80 is the data element ($RO^0_{kj}$, $RO^1_{kj}$) to be read out from the memory. The data element is first temporarily stored in the association register 80 and then transmitted to an I/O channel. Thus, the association register 80 is used as an output buffer. The last kind of inputs is the interrogation bit information ($bs_{kj}$ and $br_{kj}$) determined in the process of ordered retrieval. This is described in more detail in (e) of this section.

The interrogation selector 82, which stores ($D_{kj}$), is used to determine the bit position to be interrogated. A 0 in the mask bit means that the bit position is masked during interrogation. Since all interrogations are performed in a serial-by-bit mode, only one bit position is interrogated at a time. Hence only one mask bit has a value 1.

A column sense output register 84, which stores ($X_{kj}$), is provided to control the interrogation during the ordered retrieval process. Only bit positions with $X_{kj}=1$ are used for select interrogation. The X bit is set either manually before any operation is performed in the BAM or by the column sense output ($OCS^0_{kj}$, $OCS^1_{kj}$) during ordered retrieval operation. It is reset after a select interrogation is performed and a single response is detected. Signal $P_{kj}=1$ indicates that there is at least one bit to the right of the $j$th bit having X=1. The column sense interrogation is performed on the bit positions with $p_j=0$ (detail of this is described in (e) of this section). In "Equal-To" and "Greater-Than" searches all $X_{kj}$'s are set to 1 to inhibit column sense interrogations and only $CP_2$ is applied, The column-sense and select interrogations can be expressed as follows:

$$CSI_{kj}=CP_2 \cdot d_{kj} \cdot \bar{p}_{kj}, \text{ and}$$

$$SLI_{kj}=CP_2 \cdot d_{kj} \cdot x_{kj}.$$

The truth table for the interrogation bit inputs is given below:

TABLE NO. 3

| $CSI_{kj}$ | $SLI_{kj}$ | $b_{kj}$ | $I^0_{kj}$ | $I^1_{kj}$ |
|---|---|---|---|---|
| 0 | 0 | 0 | 0 | 0 |
| 0 | 0 | 1 | 0 | 0 |
| 0 | 1 | 0 | 1 | 0 |
| 0 | 1 | 1 | 0 | 1 |
| 1 | 0 | 0 | 1 | 1 |
| 1 | 0 | 1 | 1 | 1 |

The readout drive $RD_k=CP_1 \cdot mi_1$ energizes the $I^0_{kj}$ line only when a matched data element is to be read out in an ordered retrieval operation.

The serial-by-bit interrogation is always performed in the direction from the left to the right. After a bit position is interrogated the delayed select interrogation drive $\Delta SLI_{kj}$ resets the selector 82 and sets the next selector 82 [$D_k(j+1)$]. The interrogation pulse $CP_2$ thus drives the ($j$+1th bit position at the next cycle. When the last bit has been interrogated, a signal $eob_k=CP_2 \cdot d_{kn_k}$ is sensed when $n_k$ is the number of bits in the $k$th BAM. This is not shown in FIG. 8. AND-gates and OR-gates are shown in FIG. 8 in standard notation and serving the indicated logical functions.

In order retrievals each interrogation cycle consists of two pulses $CP_1$ and $CP_2$. However, only one clock pulse is used in search operations except in GST and SST searches which are actually implemented through the ordered retrieval operations.

To perform a "Similar-To" search (SMT), the specified reference word B and mask condition D are sent into the registers 80 ($B_k$) and 84 ($X_k$) respectively. During this search the content of the register 80 is not changed and the masked bit positions are not interrogated. The search is terminated after the last unmasked bit position is interrogated, which is indicated by $c_{kn_k}=1$ (refer to (e) of this section).

b. Bit structure

Figure 9:
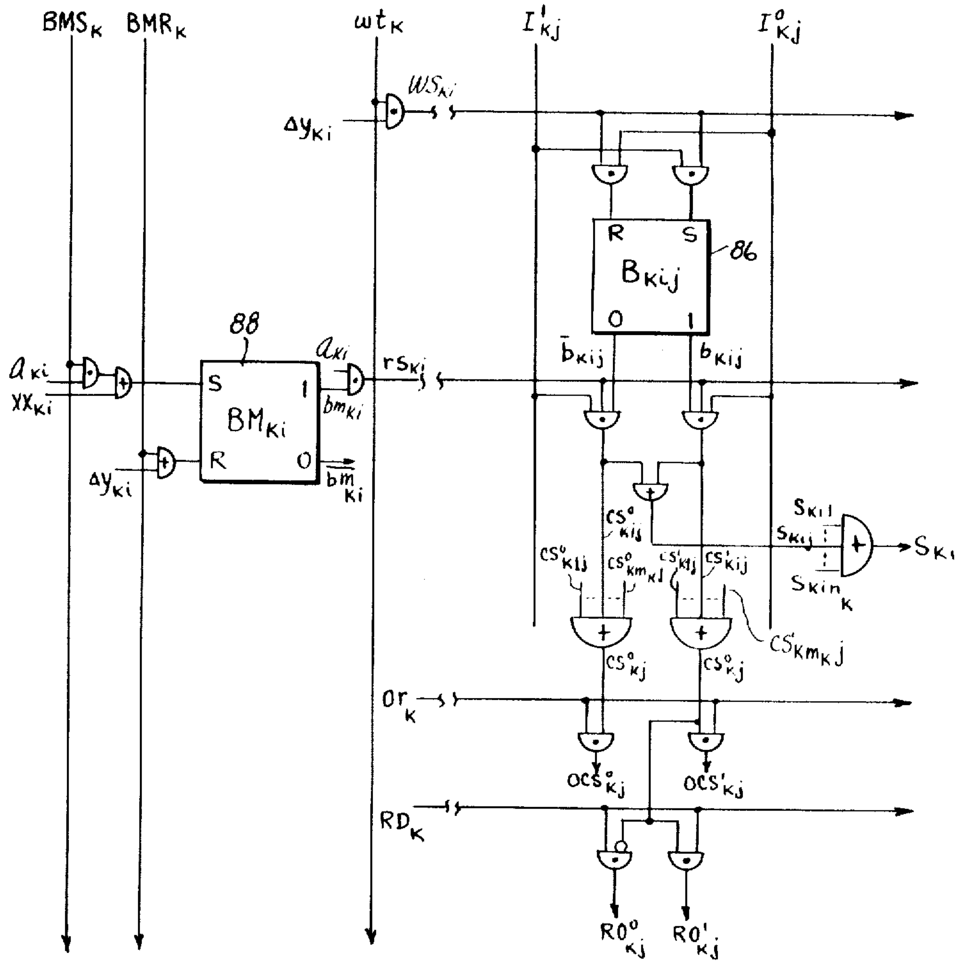
FIG. 9 is a block diagram of a mark bit and memory bit storage device associated with the *i*the bit of the *k*th BAM of the invented system.

Referring to FIG. 9, a flip-flop 86 storing $B_{kij}$ is used as a bit storage unit. Two interrogation lines $I^1_{kj}$ and $I^0_{kj}$ are going through all $j$th bits in the memory. The word write select $ws_{ki}$ is used, in conjunction with the interrogation lines to write a word into the $i$th word position. With this arrangement the updating information can be written into the desired word position without first clearing the old storage.

The relation between a memory bit content $b_{kij}$, its interrogation drivers $I^1_{kj}$ and $I^0_{kj}$, and its bit output $S_{kij}$ is given in the truth table below:

Table No. 4

| $I^1_{kj}$ | $I^0_{kj}$ | $b_{kij}$ | $S_{kij}$ |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 1 |
| 1 | 0 | 1 | 0 |

In the above table 4, $S_{kij}$ designates a mismatch between the bit content and the interrogation bit. All bit outputs of a word are ORed together to give a word output.

During the column sense interrogation in ordered retrievals, the column sense outputs $CS^1_{kj}$ and $CS^0_{kj}$ are given by $$CS^1_{kj}=I^0_{kj} \cdot \sum_{i=1}^{m_k} rs_{ki} \cdot b_{kij}$$

and $$CS^0_{kj}=I^1_{kj} \cdot \sum_{i=1}^{m_k} rs_{ki} \cdot \bar{b}_{kij}$$

where $rs_{ki}$ is the read select signal ($rs_{ki}=1$ for the selected th word). These outputs are gated by $or_k$ signal to control the ordered retrieval process.

When a single response, say the $i$th word, is detected during the ordered retrieval, $RD_k=CP_1 \cdot mi_1=1$ This makes $I^0_{kj}=1$. Since the read select $rs_{ki}=1$, the values of $CS_{kj}$, $RO^0_{kj}$ and $RO^1_{kj}$ are dependent on the bit value, $b_{kij}$. As a result, the association register 80 ($B_k$) is set according to the content of the $i$th word and readout can be performed through the I/O channels of FIG. 8. In FIG. 9, the flip-flop 88 ($BM_{ki}$); the shown AND gates and OR gates are of standard construction and serve the logical functions indicated in the drawing.

c. Mark bit—FIG. 9.

A mark bit 88 ($BM_{ki}$) is provided for every word (data element) in every BAM (FIG. 9). It is used to store the select condition of the word. Its state, together with the match condition of the word, determines whether or not the word will be interrogated or read out. It is set by either the result of the previous search ($a_{ki}$) or the select condition from the APU 38, i.e., the output of the decoder ($xx_{ki}$).

d. Match detector, lock bit and response resolver circuit—FIG. 10.

Figure 10:
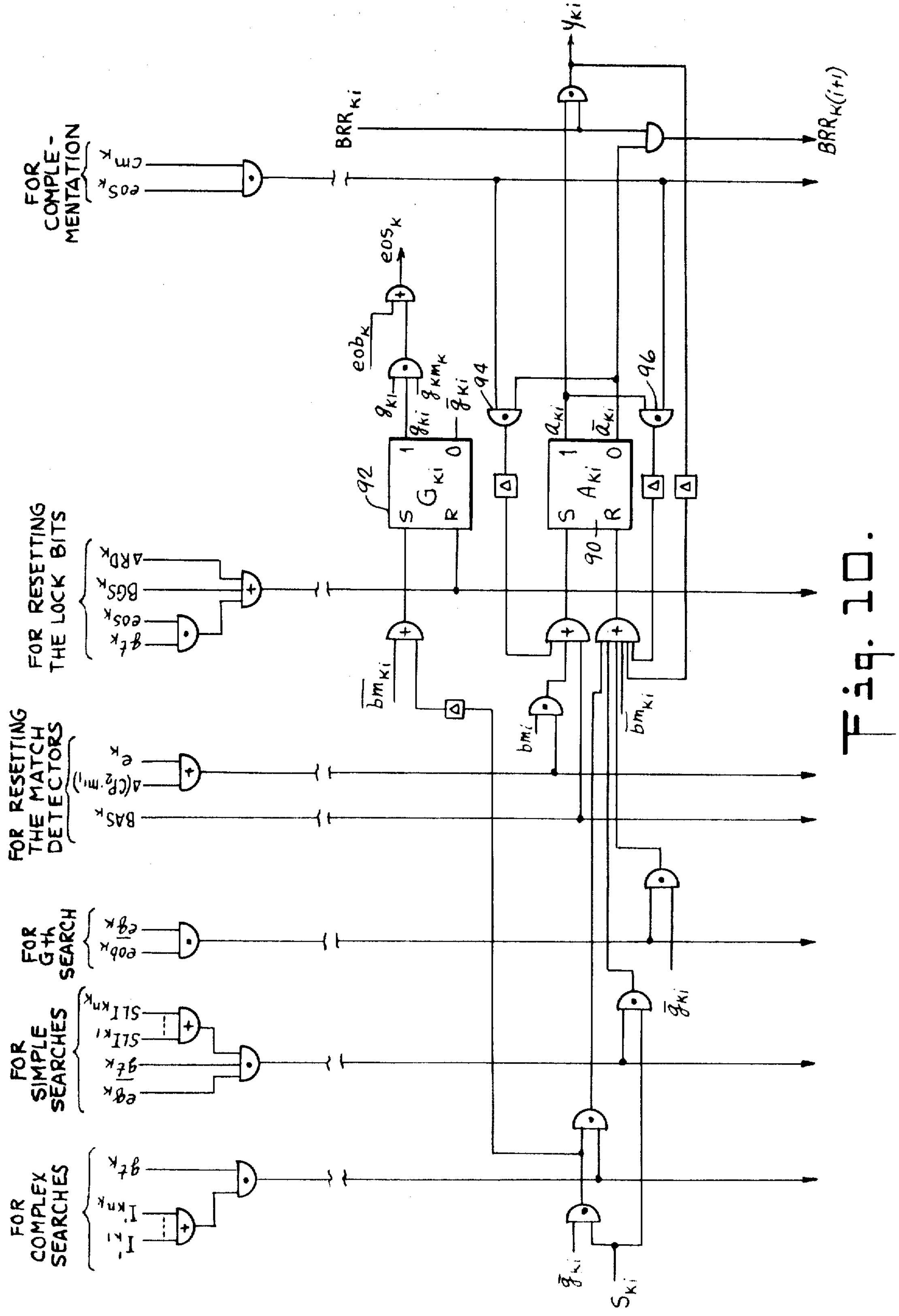
FIG. 10 is a block diagram of a match detector, block bit, and response resolver circuit.

A match detector 90 ($A_{ki}$), a lock bit 92 ($G_{ki}$), and a response resolver circuit are shown in FIG. 10. The $i$th match detector 90 detects and stores the match condition of the $i$th word. It is always set into the match state ($a_{ki}$= 1) before any interrogation starts. If a match condition is to be recovered during a certain search operation, only the selected words are set into the match state and all others remain in the mismatch state.

In simple searches, any mismatch signal will set the match detector into mismatch state, while in complex searches only mismatch signals with interrogation bit equal to 1 will set the match detector into the mismatch state.

The lock bit 92 ($G_{ki}$) is used to determine whether the state of the associated match detector 90 ($A_{ki}$) can be changed or not. All match detectors 90 are originally in match state and are not locked by the storage 92 ($G_{ki}$). Any mismatch match signal, $S_{ki}$, will set the lock bit 92 to 1. In a "Greater-Than" search, the match detector 90 will be reset or left in match state, depending upon whether the interrogation bit is 1 or 0, respectively. If a BAM 34 has a word with its value equal to the interrogation word, no mismatch signal will be detected — the match detector 90 remains in match state and unlocked. Thus, the combinations of the states of the match detector 90 and the lock bit storage 92 divide the memory words into three categories: those greater than, smaller than, or equal to the interrogation word, as indicated in the table below:

Table No. 5

| Lock Bit $G_{ki}$ | Match Detector $A_{ki}$ | Range |
|---|---|---|
| 0 | 0 | (Unselected) |
| 0 | 1 | Equal to |
| 1 | 0 | Smaller Than |
| 1 | 1 | Greater Than |

When it is necessary to reset the lock bits in the storage 92 during ordered retrieval and some search operations, only those of the selected words ($bm_{ki}$=1) will be unlocked. For example, in Between-Limits Type A search, after Smaller-Than-Or-equal-To search, only those words with unlocked match detectors 90 are searched. In order retrieval, the lock bits of selected words are reset after each matched word is retrieved. The truth table for the states of the match detector and the lock bit in a complex search operation is given in the table directly below:

Table No. 6

| $1_{kj}$ | $b_{kij}$ | $a^{t}_{ki}$ | $g^{t}_{ki}$ | $a^{t+1}_{ki}$ | $g^{t+1}_{ki}$ |
|---|---|---|---|---|---|
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 0 | 0 |
| 0 | 1 | 0 | 1 | 0 | 1 |
| 0 | 1 | 1 | 0 | 1 | 1 |
| 0 | 1 | 1 | 1 | 1 | 1 |
| 1 | 0 | 0 | 0 | 0 | 1 |
| 1 | 0 | 0 | 1 | 0 | 1 |
| 1 | 0 | 1 | 0 | 0 | 1 |
| 1 | 0 | 1 | 1 | 1 | 1 |
| 1 | 1 | 0 | 0 | 0 | 0 |
| 1 | 1 | 0 | 1 | 0 | 1 |
| 1 | 1 | 1 | 0 | 1 | 0 |
| 1 | 1 | 1 | 1 | 1 | 1 |

In some search operations the match conditions of all memory words are determined before all bits are interrogated. All match detectors 90 are locked and the search operation is stopped by the signal $\prod_{i=1}^{m_k} g_{ki} = 1$ Thus, any search operation is stopped by the "End of Search" signal $eos_k = eob_k + \prod_{i=1}^{m_k} g_{ki}$.

If a BAM 34 has a word with its value equal to the interrogation word, after $eob_k$=1 is sensed, its match detector 90 is reset for a "Greater-Than" search ($eob_k \cdot \overline{eq}_k$=1) or remains in match state for a "Greater-Than-Or-Equal-To" search.

Some searches (such as "Not-Equal-To" search) are the complements of other basic searches. These searches followed by complementing the match condition ($a_{ki}$'s) at the end of the operations. The complementation is performed through two AND-gates 94 and 96 connected at the outputs of each match detector 90.

To retrieve the matched data element(s) from a BAM 34 after a search operation is finished we apply $BRR_k$ to select the uppermost matched word. Once a word is selected, its match detector 90 and mark bit are reset so that it will not be selected again. The Boolean expressions of the retrieved word output and the change of the match condition are:

$$y_{ki} = a_{ki} \cdot BRR_{ki} = a_{ki} \cdot \bar{a}_{k(i-1)} \ldots \bar{a}_{k1} BRR_{ki},$$

and $\bar{a}_{ki} = \Delta y_{ki}$, where $BRR_{ki} = BRR_k$. If all matched data elements are selected a signal $e_k = \bar{a}_{k1} \cdot \bar{a}_{k2} \ldots \bar{a}_{km} \cdot BRR_k$ is detected.

e. Ordered retrieval control circuit

Referring back to FIG. 8, the ordered retrieval control (ORC) circuit consists of three flip-flops (84, 80, 82) for each bit position, $X_{kj}$, $B_{kj}$, and $D_{kj}$ respectively. Whenever the $j$th column sense output is in the X state the $X_{kj}$ flip-flop 84 is set. The content of the $B_{kj}$ flip-flop 80 is determined by the ordered retrieval procedure. The interrogation selector 82 ($D_{kj}$) controls the bit position to be interrogated as described previously. Its state is controlled by the state of the $X_{kj}$ flip-flop 84. The inputs of these flip-flops and various signals in the ORC circuit are described below:

$X_{kj}$=1: $j$th column sense output is in the X state, i.e., $$X_{kj} = OCS^{0}_{kj} \cdot OSC^{1}_{kj} = 1$$

$X_{kj}$ flip-flop 84 is reset when (1) the column sense output is either 0 or 1 ($OCS^{0}_{kj} \oplus OCS^{1}_{kj} = 1$) and (2) the select interrogation at one bit position to the left of the $j$th bit has a single response ($mi_1$=1). This may be expressed by the following equations:

$$\bar{X}_{kj} = xr_{kj} = mi_1 \cdot \Delta f_{kj} + (OCS^{0}_{kj} \oplus OCS^{1}_{kj})$$

where $$f_{kj} = SLI_{k1} + SLI_{k2} + \ldots + SLI_{k(j-1)}.$$

$P_{kj}$=1: There is at least one bit position with $X$=1 to the right of the $j$th bit.

$$P_{kj} = x_k(j+1) + x_k(j+2) + \ldots + x_{kn_k}.$$

$sb_{kj}$=1: When multiple responses are indicated by the MI register after a sense interrogation is performed and $x_{kj}$=1 is detected, the flip-flop 80 ($B_{kj}$) is set to 0 (for ascending-order retrieval).

$$sb_{kj} = CP_1 \cdot mi_2 \cdot x_{kj}.$$

As mentioned before the fifth bit of OPCC, DO, is used to control the type of the ordered retrieval. The value of the $B_{kj}$ flip-flop 80 is thus determined generally by $$br_{kj} = sb_{kj} \cdot \overline{do}_k,$$

and $$bs_{kj} = sb_{kj} \cdot do_k.$$

$ds_{kj}$=1: The $j$th bit is to be interrogated provided that multiple responses were detected ($mi_2$=1) at the previous bit position (this is controlled by $$ID_k=CP_2\cdot\overline{mi_0}\cdot\overline{mi_1} \text{ in FIG. 8}).$$

$$ds_{kj}=c_{kj}(x_{kj}+P_{kj}), \text{ where } c_{kj}=\Delta SLI_{k(j-1)}+\Delta CSI_{k(j-1)}\cdot\bar{x}_{k(j-1)}+\bar{x}_{k(j-1)}\cdot P_{k(j-1)}\cdot c_{k(j-1)}\ j=2,3,\ldots n_k \text{ and } C_{k1}=CP_1\cdot st_k+\Delta(CP_2\cdot mi_1)+\Delta CP_2\cdot st_k$$

$c_{kj}=(2\leq j\leq n_k)$ is equal to 1 if (1) the last interrogated bit to its left has just been select interrogated $[\Delta SLI_{k(j-1)}=1]$, or (2) the last interrogated bit has been column sense interrogated and $\bar{x}_{k(j-1)}=1$, i.e., $\Delta CSI_{k(j-1)}\cdot\bar{x}_{k(j-1)}=1$ or, (3) $j$th bit follows one or more $x=0$ bits which need not be interrogated $[\bar{x}_{k(j-1)}\cdot P_{k(j-1)}\cdot C_{k(j-1)}=1]$ $_k$d kj is set if $c_{kj}=1$ and 1. $x_{kj}=1$, or
2. there is no $x=1$ bit to the right of the $j$th bit $(\overline{p_{kj}}=1)$.

In $c_{k1}$, the signal $st_k$ is the output of the START flip-flop, ST, in the $k$th BAM which is in state 1 before the operation is started and it is reset after the first interrogation is performed, $\overline{st_k}=\Delta c_{k1}$.

$c_{k1}$ is equal to 1 when 1. the ordered retrieval starts, or
2. a matched data element is retrieved, or
3. a search operation starts.

$dr_{kj}=1$: The interrogation selector bit is reset under three conditions:

1. After the select interrogation is performed at the $j$th bit,
2. after the column sense interrogation is performed and $x=0$, and
3. when an answer is reached $(mi_1=1)$.

Thus, we have $$dr_{kj}=\Delta SLI_{kj}+(\Delta CSI_{kj})\cdot\bar{x}_{kj}+CP_2\cdot mi_1,$$

$$j=2,3,\ldots,n_k,$$

where $dr_{k1}=\Delta SLI_{k1}+(\Delta CSI_{k1}\cdot\bar{x}_{k1}$.

$CSI_{kj}=1$: The column sense interrogation drive is activated by $$CSI_{kj}=ID_k\cdot d_{kj}\cdot\bar{P}_{kj}.$$

Only an unmasked bit position not having any $x=1$ bit to its right is to be column sense interrogated.

$SLI_{kj}=1$: The select interrogation drive is activated when the $j$th bit is unmasked and having $x_{kj}=1$, i.e., $$SLI_{kj}=ID_k\cdot d_{kj}\cdot x_{kj}.$$

$I^0_{kj}$, $I'_{kj}$: There are two interrogation bit drives.

$$I^0_{kj}=CSI_{kj}+SLI_{kj}\cdot b_{kj}+CP_1\cdot mi_1=ID_k\cdot d_{kj}\cdot(\bar{p}_{kj}+x_{kj}\bar{b}_{kj})+CP_1\cdot mi_1\cdot$$

$$I^1_{kj}=CSI_{kj}+SLI_{kj}\cdot b_{kj}=ID_k\cdot d_{kj}\cdot(\bar{P}_{kj}+x_{kj}b_{kj}).$$

In the last term of $I^0_{kj}$, signal $(CP_1\cdot mi_1)$ is used to have the matched word read out.

The initial condition set for ordered retrieval are as follows: $x_{kj}=0$, $b_{kj}=0$. $d_{kj}=0$ for all bit positions and the MI register is reset $(mi_r=1)$. Each cycle time in ordered retrieval has two clock pulses $CP_1$ and $CP_2$, they are applied repeatedly until the whole operation is stopped by a Y state in the column sense output at any bit position $$(\overline{OCS}^0_{kj}\cdot\overline{OCS}^1_{kj}=1).$$

When a matched data element is detected $(mi_1=1)$ $CP_1$ of the next cycle is used to read out the matched data element ($CP_1\cdot mi_1$ in $I^0_{kj}$). Then $CP_2$ will transfer the information from $B_k$ to I/O channel $(CP_2\cdot mi_1)$ and reset all $d_{kj}$'s. The delayed signal $[\Delta(CP_2\cdot mi_1)]$ is used to set the mask bit of the leftmost bit position with $X=1$. The MI register is also reset by $\Delta(CP_2\cdot mi_1)$.

iii. Binary Indexing Code Section—FIG. 11.

Figure 11:
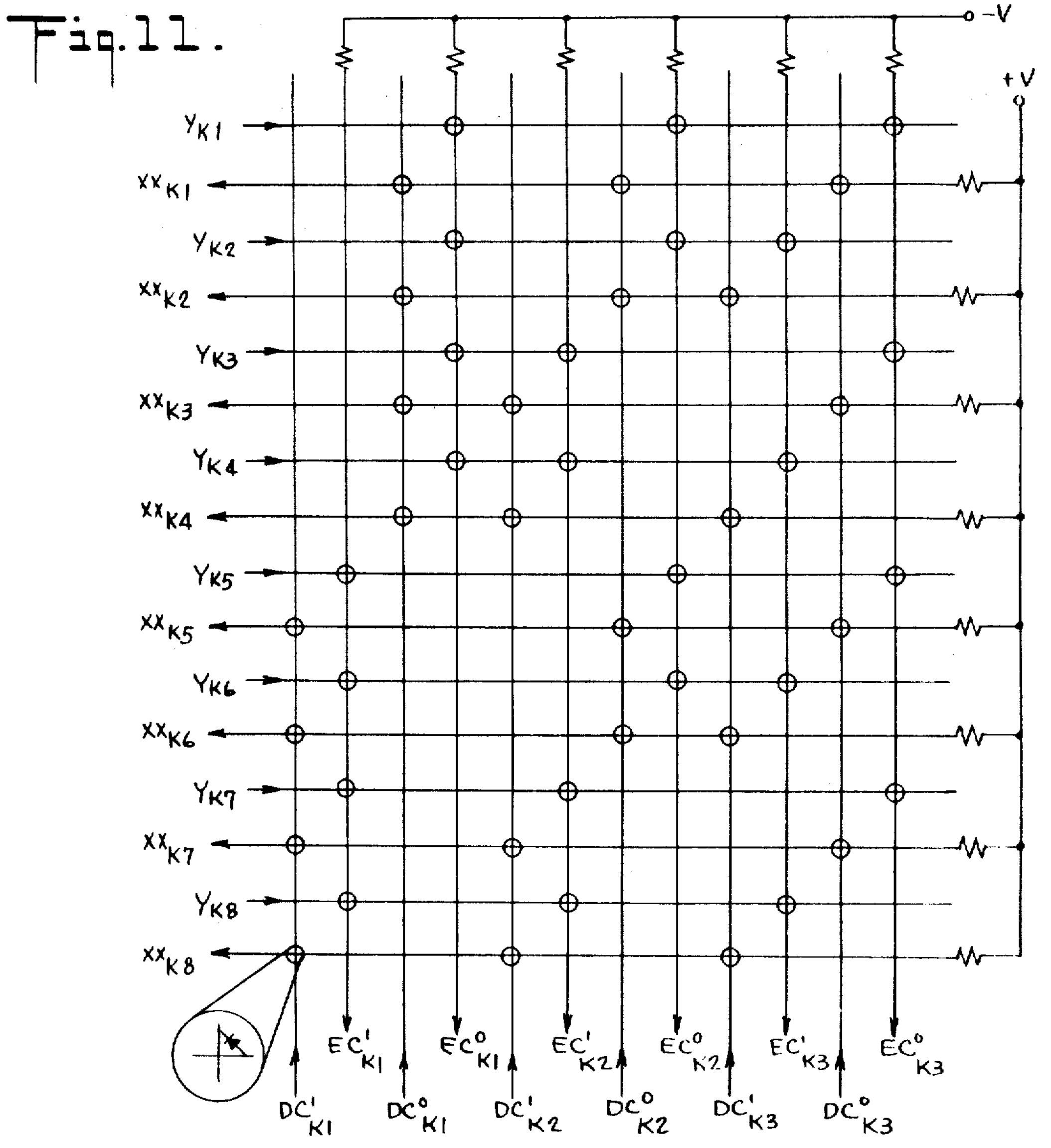
FIG. 11 is a diagram of a binary indexing code section of an exemplary basic associative memory storing eight data elements distinct from each other.

A combined encoder-decoder may be constructed by two matrices with storage elements such as diodes, as shown in FIG. 11. The encoder is used to encode a matched data element into a BIC number to be stored in the APU 38. The decoder is used to decode a BIC number selected from the APU 38 to identify the corresponding data element. This is used for the screening process.

iv. Associative Processing Unit a. Interrogation and ordered retrieval control circuit—FIG. 12

There are F units of interrogation and ordered retrieval control circuits, one for each section of the APU 38. Each of these F units is structured exactly the same as the one used for a BAM 34. The only difference is that the "input" lines of the B register in APU are connected to the outputs of the corresponding encoder ($EC^1_{kj}$ and $EC^0_{kj}$) and the outputs of the B register are connected to the corresponding decoder ($DC^1_{kj}$ and $BC^0_{kj}$) instead of I/O channels.

Figure 12:
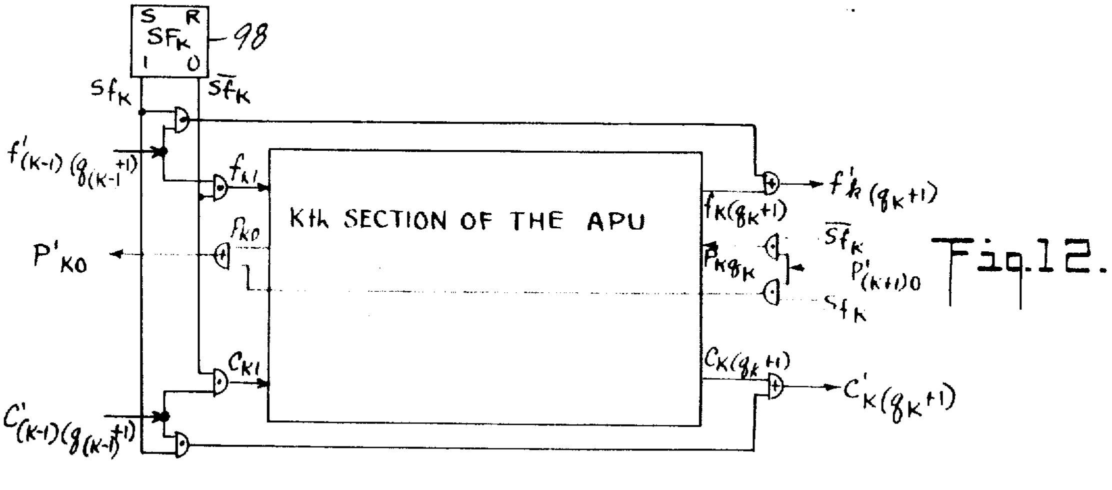
FIG. 12 is a block diagram showing the interflow of signals associated with a section of the associative processing unit.

For resolving multiple responses, the APU 38 utilizes the ordered retrieval procedure to have the matched information items retrieved. The ordered retrieval applied here is generally performed on the entire APU 38. However, sections corresponding to BAM's 34 having single response are skipped since the interrogation of these sections will not contribute any information for further selection. With reference to FIG. 12, in providing this feature to the system, a single response flag (SF) stored in a flip-flop 98 is one if a single matched data element is detected. The interflow control signals $p_{kj}f_{kj}$ and $c_{kj}$, as shown in FIG. 12, are given by $$p_{kq_k}=\overline{sf_k}\cdot p'_{(k+1)0} \qquad k=2,3,\ldots,(F-1),$$

$$p'_{k0}=p_{k0}+sf_k\cdot p'_{(k+1)0} \qquad k=1,2,\ldots,(F-1),$$

$$p'_{F0}=p_{F0},$$

$$f_{k1}=\overline{sf_k}\cdot f'_{(k-1)(q_{(k-1)}+1)} \qquad k=2,3,\ldots,F,$$

$$f'_{k(q_k+1)}=f_{k(q_k+1)}+sf_k\cdot f'_{(k-1)(q_{(k-1)}+1)} \qquad k=2,3,\ldots,(F-1),$$

$$f'_{11}=f_{1(q_1+1)}, \text{ and}$$

$$c_{k1}=\overline{sf_k}\cdot c'_{(k-1)(q_{(k-1)}+1)} \qquad k=2,3,\ldots,F$$

$$c'_{k(q_k+1)}=c_{k(q_k+1)}+sf_k\cdot c'_{(k-1)(q_{(k-1)}+1)} \qquad K=2,3,\ldots,(F-1),$$

$$c'_{11}+c_{1(q_1+1)},$$

where $q_k$ is the number of bits in the $k$th section of the APU 38. These equations show that when a BAM 34 has a single response $(sf_k=1)$ the interflow signals coming from its next section (for $f$ and $c$ signals, the left neighboring section and for $p$ signal its right) will skip this section and go to the next one. If a BAM has multiple response, these interflow signals will go through every bit of this section.

b. Bit structure—FIG. 13.

Figure 13:
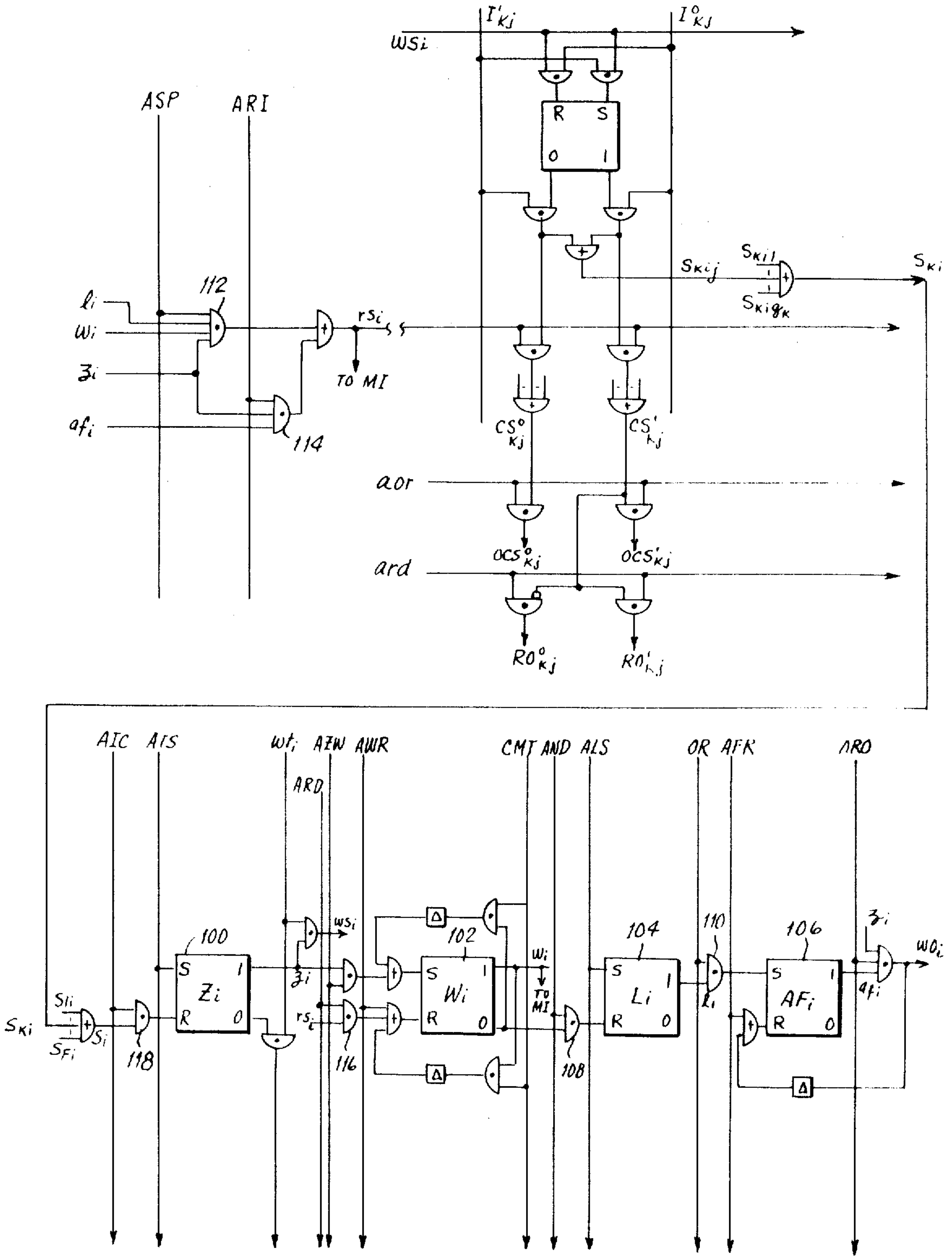
FIG. 13 is a block diagram of a memory bit and match detector section associated with a word from the associative processing unit.

The bit structure of the APU 38 is slightly different from that of BAM's 34 which was shown in detail in FIG. 9. With reference to FIG. 13 which shows the memory bit and match detector section of the $i$th word in the APU 38, the read and sense word select $rs_i$ is gated only in the column sense output wires. We do not want to inhibit the select interrogation as we did in the BAM's 34 for unselected words because in the APU 38, OR relations may exist among searches of the BAM's. No specific mark bit is used in the APU 38, the read and sense select, $rs_i$ is controlled by the outputs of the match detectors. More details are given in the following section.

c. Match detector section—FIG. 13.

The match detector section of FIG. 13 consists of four detectioors: the temporary match detector 100 (Z), the match detector 102 (W), the compound match detector 104 (L) and the final match detector 106 (AP). We define an instant match condition to be the match responses of information items after one bit is select interrogated. The temporary match detector 100 ($Z_i$), is originally set before the interrogation of the $k$th section starts. It is reset by any mismatch signal during the interrogations. At the end of the interrogations the states of the match detectors 100 ($Z_i$'s) give the temporary match condition for one matched data element in the $k$th BAM 34. This temporary match condition is gated to the W detector 102 by AZW. The succeeding temporary match conditions set additional W detectors 102. When all matched data elements of the $k$th BAM 34 are selected and their BIC numbers are interrogated in the APU 38, the states of the detector 102 indicate the match condition for the $k$th BAM. If a COMPLEMENT relation exists in the search operation performed on the BAM 34, it can be achieved by activating CMT to invert the match condition. If the relationships among BAM's are AND relations, the match conditions to the searches of all these BAM's are combined through an AND gate (AND line in FIG. 13 going as an input to an AND-gate 108 and stored in the compound match detectors 104). For composite searches, OR relation may exist among the BAM's 34. Furthermore, any complicated search expressions can always be expanded into a two-level Boolean function, e.g., $[(A \cdot B \pm C) \cdot D \pm E.F] \cdot G = A \cdot B.D \cdot G + C.D \cdot G + E \cdot F \cdot G$, then the match conditions of information items to searches related by AND relations ($A \cdot B \cdot D \cdot G$, $C \cdot D \cdot G$, and $E \cdot F \cdot G$ in this example) can be obtained in the way described. The final match condition is formed by combining these match conditions through OR relations (OR line in FIG. 13 connecting to an AND-gate 110) and stored in the final match condition detector 106.

Recall that during ordered retrieval operation, a matched word is retrieved whenever a single response is detected following a select interrogation. The procedure described in section B.(iii) of this chapter II was employed in BAM's 34 where only distinct data elements are stored. However, in the APU 38, information (BIC numbers) stored in one section are usually not distinct. The procedure for ordered retrieval has to be modified slightly to sense that an answer is reached. In addition to detecting a single response by the match indicator, we can retrieve the matched words (carrying the same information) after the last bit position is interrogated. For no two distinct words (information items) can remain in the match state after all bits are interrogated. Then, instead of reading out a matched word by ($CP_1 \cdot mi_1$) as stated in the ORC circuit of BAM, we use $$CP_1 \cdot [mi_1 + \Delta SLI_{cq_k} + \Delta CSI_{kq_k} \cdot \bar{x}_{kq}] = 1$$

to read out the matched word (or words).

The interrogation line $I^0_{kj}$ in the APU 38 now becomes $$I^0_{kj} = ID_k \cdot d_{kj} \cdot (\bar{p}_{kj} + x_{kj} \cdot b_{kj}) + CP_1 \cdot [mi_1 + \Delta SLI_{kq_k} + (\Delta CSI_{kq_k}) \cdot \bar{x}_{kq_k}]$$

where all signals are referred to the ORC circuit in the APU.

The read and sense select control, $rs_i$, is used for ordered retrieval operations in the screening process and resolving multiple responses. The screening process is conducted to transfer the select condition of the BIC numbers of the currently matched information items ($l_i=1$) in the, say, $k$th section of the APU 38 back to the $k$th BAM 34 (refer to section B.(iv).(a) above). During the ordered retrieval operation in the screening process the detector 100 is used to store the instant match condition and the detector 102 is used to mark the retrieved words ($w_i=0$ for retrieved $i$th word). The detector 104 stores the current match condition required to remain unchanged during the process. Signal ($l_i \cdot z_i \cdot w_i$) is gated through AND-gates 112 and 114 by screening process control ASP to control the word to be column-sense interrogated. The number of matched words are detected at $rs_i$'s. Each time after a word (or words with the same information) is retrieved, the detectors 100 are set for the next interrogations and the detectors 102 of the retrieved words are reset by the signal $ARD \cdot rs_i$ at the output of an AND-gate 116.

After all search operations are performed in the BAM's 34, the ordered retrieval is applied in the APU 38 to resolve multiple information items. During this process signal ($a_i \cdot z_i$) is gated by ARI through the AND-gate 114 to control the $i$th word to be column-sense interrogated. Each retrieved information item will have its final match condition detector 106 reset so that it will not be retrieved again.

When a new information item is to be stored, after all its data elements are identified in the BAM's 34, a search for the available space is performed in the APU 38 by interrogating 00...0. More than one space usually exists in the APU 38, and a sequencing circuit is used to control writing the new information item into the first available space ($ws_i = z_i \cdot wt_i = 1$).

In the match detector section, AIC is used to gate the mismatch signal S through an AND-gate 118 when select interrogation is performed. ATS is used to set the detector 100 before a BIC number is interrogated and ALS is used to set the detector 104 before search operations related by AND relation is performed. AWR resets the detector 102 before a search in a BAM 34 is performed. AFR is used to reset the detector 106 before any search operation starts. CMT, AND, and OR are logic relation control signal. ARO is the matched item readout signal. Column sense signals $CS^0_{kj}$ and $CS^1_{kj}$ are gated by "aor" or "ard" to be column sense outputs ($OCS^0_{kj}$ and $OCS^1_{kj}$) or readout information ($RO^0_{kj}$ and $RO^1_{kj}$), respectively.

III. AN ASSOCIATIVE MEMORY SYSTEM WITH A RELATION CUBE

From the preceding discussion it can be seen that the associative processing unit (the APU 38) still occupies a great deal of memory cells. A more economical associative memory system is described in detail in this chapter III.

In the preceding chapter II, the relation cube as defined in connection with FIG. 3, is implemented by an APU. In the description below, the relation cube is constructed from a group of semipermanent devices and associated electronic circuits. This method of implementation is a direct interpretation of the original concept discussed in connection with FIG. 3 where a dot in the relation cube represents a stored information item composed by two corresponding data elements with the sense lines crossing the dot. In the system shown below each dot is a semipermanent device. The presence of a dot is equivalent to the existence of one particular information item. In addition, with the aid of a ternary match indicator (FIGS. 5 and 6), the number of dots on a single energized line can be determined as greater than, equal to, or less than one. Extending the concept of a two-dimension cube to F-dimensional one we can see than an F-dimensional relation cube is used to test:

i. if there is any information item whose descriptor matches all specified data elements of F fields, and
ii. whether the number of information items responding to the specified data elements of less than F fields is greater than, equal to, or less than one.

The feature of two-way communication between the BAM's 34 and the APU 38 in the previous system has been eliminated in this system. The direction of communication is always from the BAM's 34 to the relation cube. As a result of this elimination, the decoder part of the code sections has been eliminated also. The structure of the encoder part remains unchanged but its function is somewhat different from what it was used for in the previous system. In this system the encoder is used to reduce the number of variables for identifying distinct data elements. In some applications, the reduction in the number of variables is not essential; the encoder of each BAM 34 can then be omitted. The relation elements in the relation cube then comprise a flip-flop and several suitable logic gates. If we use one variable (one pair of lines in the circuit) for each of M different data elements, there would be *m* different variables. But through the encoder we can use only at most *q* different variables, where $$2^q \geq m > 2^{q-1}$$

By the use of different combinations of these *q* variables every data element can be identified distinctively.

Recall that the purpose of the ordered retrieval control circuit in the APU 38 of the previous system was to transfer the select condition back to the BAM's during the screening process. Since in the present system the communication from the relation cube to the BAM's 34 is not available, the ORC circuit is not needed. Instead, a special procedure for resolving multiple responses is provided.

A. Organization—FIG. 14.

Figure 14:
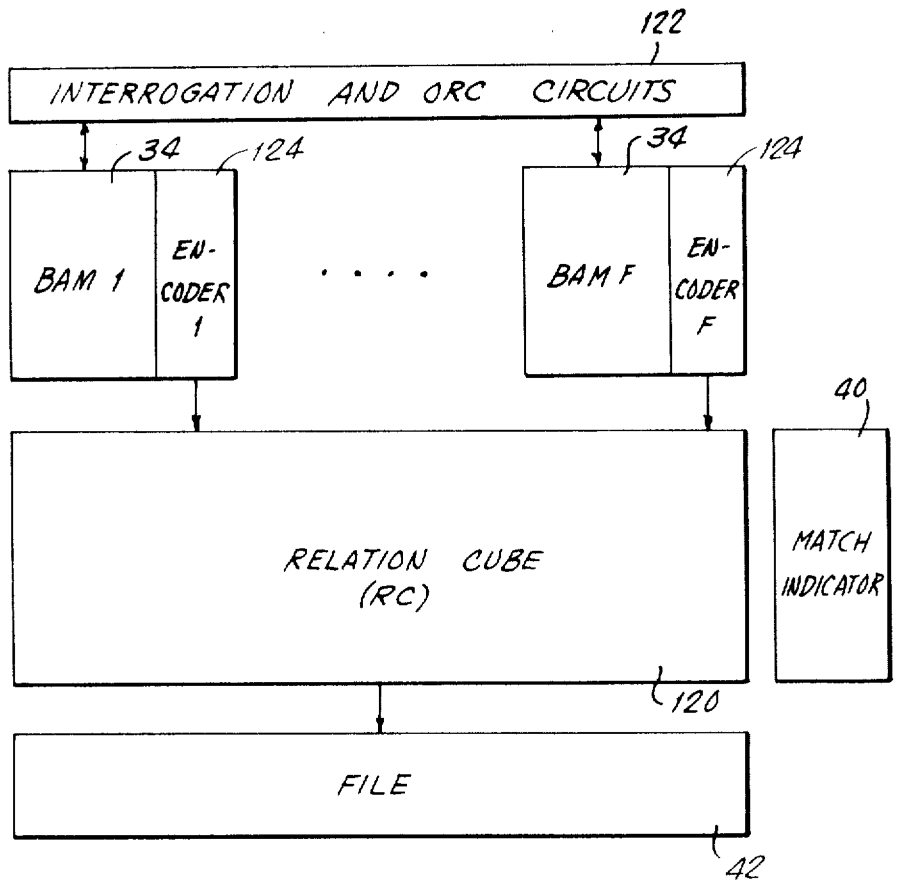
FIG. 14 is a block diagram of a modification of the associative memory system of FIG. 4.

With reference to FIG. 14, the system is organized much the same as in the system using APU except that the APU 30 is replaced by the relation cube. In addition, there are also some other minor changes as described herein.

i. Interrogation and ORC Circuits 122, BAM's 34, Match Indicator 40, and File 42.

All these units are exactly the same as those in the previous system.

ii. Encoder 124

The code section in each BAM 34 of the system using an APU 38 is simplified in this system. Only one diode matrix is used to reduce the number of identification variables.

iii. Relation Cube 120

This unit may be viewed as a semipermanent associative memory which identifies the information item by BIC numbers. Partially specified BIC numbers can also be detected in this unit.

Associated with each information item is a relation element which is used to associate physically the relationship among elements of an information item. (A pin module is chosen in this system as one of many possible means of realization of the relation elements.) The function of this relation element is mainly to identify the information item when the BIC numbers of its descriptor match those of the relation element.

B. Functional Operations i. Storing

Storing of an information item in the system begins with interrogations of its data elements in each BAM 34. If the interrogation of one particular BAM fails, a new data element is added to the BAM. The code numbers of all identified data elements are used to determine the pin locations of the pin module. This pin module carrying the code information is then put into the relation cube, followed by the storage of the descriptive data of the item in the secondary storage unit, the file.

ii. Search Operations in BAM

Search operations within a BAM 34 are exactly the same as those described in the previous system.

iii. Resolving Multiple Responses and Ordered Retrievals in BAM

Since the BAM's 34 in this system are structured exactly in the same way as those in the previous system using an APU 38, all the procedures for resolving multiple responses and ordered retrieval are applied in this system also.

iv. Retrieval Operations in System

Since the ordered-retrieval control circuit has been eliminated in the RC 120, there is no way for this system to resolve multiple responses in the RC 120. A special procedure must be provided so that it retrieves one matched information item at a time from the RC 120. Let us assume that there are P point searches and $s=(F-P)$ lines searches. Mask operation in a BAM 34 is treated as a line search with all stored data elements matched. In the procedure to be described, the point searches are performed before the line searches.

If any of these point searches has no response, the whole operation is stopped. Otherwise, in the single-response case, the code number of the matched data element is used to interrogate the RC 120. The response of this interrogation is combined, through an AND operation, with the previously determined match condition. A new match condition is thus formed and is ready for the next search operation. At the end of all point searches, the line searches are performed. The responses from any line search can be 0, 1, or more than 1. In the first two cases the procedure follows exactly the same as that described for the point searches. In the case of multiple responses, the code numbers of the matched data elements are retrieved one at a time to interrogate the RC 120. The responses of these interrogations are ORed together and their final result is then ANDed with the previously determined match condition.

During these (both point and line) searches, whenever a new match condition is formed, the number of matched information items is detected. If it is 0, the operation is also stopped.

After the last search has been performed and a single response in the RC 120 is detected, this matched information item is retrieved. In the case of multiple responses in the RC 120, we need only to consider those BAM's 34 with multiple matched data elements. We then retrieve the code number of one matched data element from a BAM 34 in a serial-by-BAM mode until a single response is detected. After a matched information item is located and retrieved, it is deleted from the group of the matched information items. The procedure continues to retrieve another matched information item and so on, until all matched information items are retrieved. The flow chart shown below gives the details of this procedure.

Flow Chart No. 5

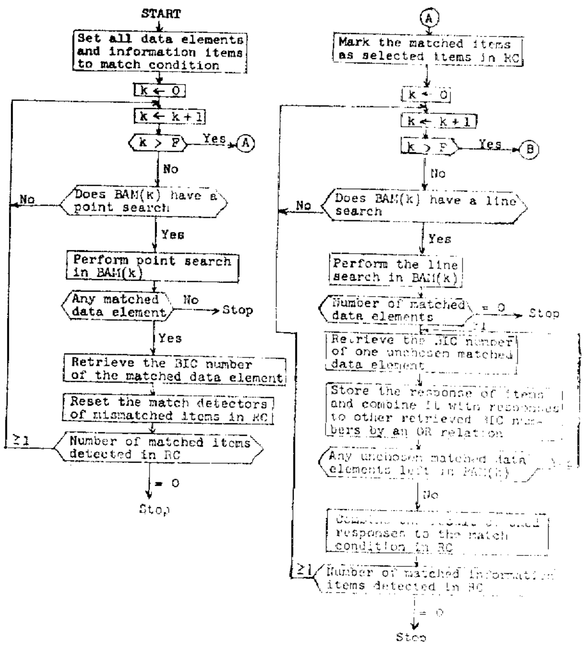

Flow Chart No. 5 (Cont'd)

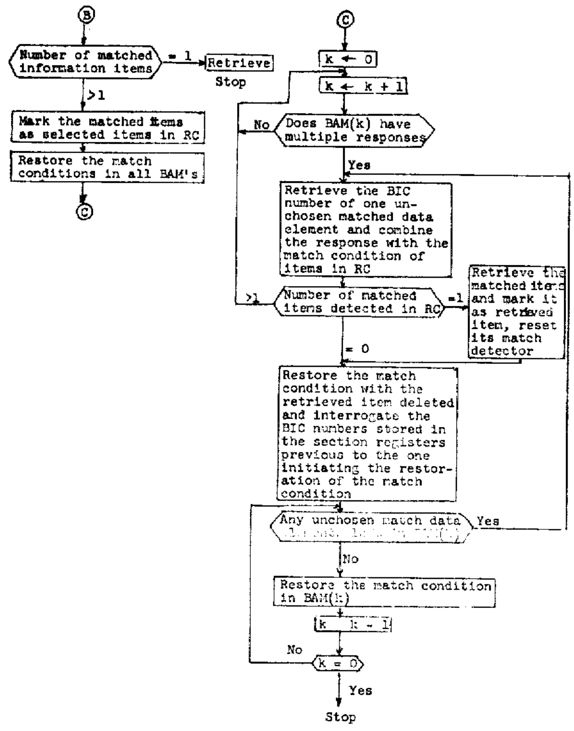

When the multiple responses in the RC 120 are resolved by the above procedure, the masked BAM's 34 are simply treated as the BAM's with all data elements matching the search criteria. All BAM's in the above procedure are separated in only two groups: those having single responses, and those with multiple responses.

Flow Chart No. 6

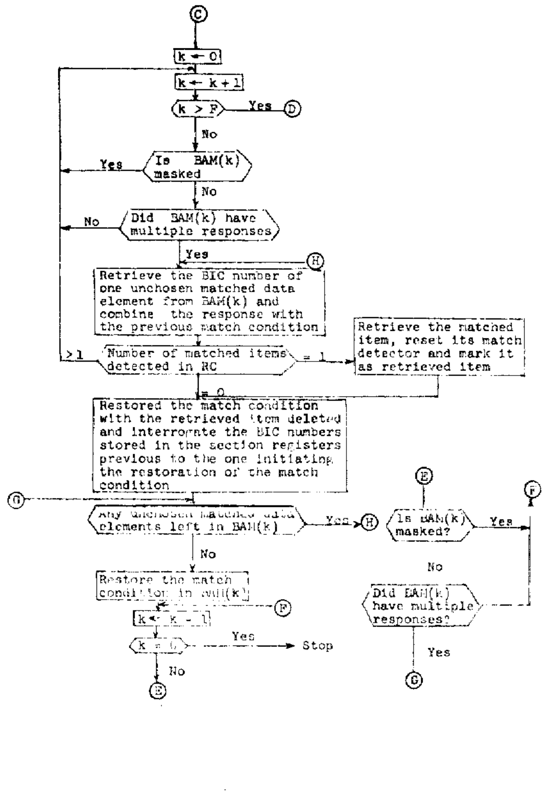

Flow Chart No. 6 (Cont'd)

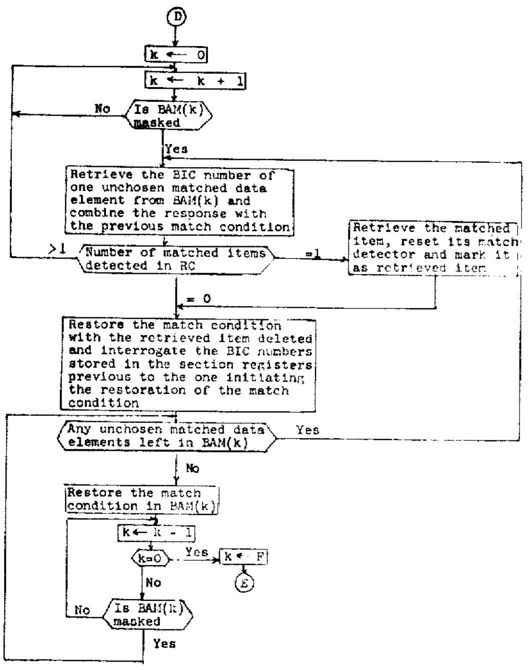

An alternative way of resolving multiple responses in the RC 120 is to categorize the BAM's 34 into three groups. These are: BAM's having single responses, BAM's having multiple responses where the number of responses of any BAM is less than the number of data elements in the BAM, and the masked BAM's. An alternative procedure with this grouping of BAM's can be used to resolve multiple responses in such a way that the matched data elements are retrieved from the BAM's 34 with multiple responses first. If more than one matched information item is detected in the RC 120, the data elements from the masked BAM's 34 are then treated. A detailed flow chart of the changed part for the alternative procedure is shown.

Resolving multiple responses with ordered retrieval in one BAM 34 follows the same procedure described in the previous system (section B.(iv).(c), the only difference is that the step ($\epsilon$) can be implemented by either one of the procedures of the last two flow charts.

(v) Deleting and Updating

Deletion of an information item begins with the interrogation of the item. After it is located, its relation element is removed from the RC 120. A checking process for trivially stored data elements is required as described in connection with the previous system.

There are three different types of updatings of information items stored in the system. The first type of updating is that the change of information item is made only in the descriptive data part (the part stored in the file 42). The second one involves replacing some of the original data elements by ones which are already stored in the BAM's 34. The last type of updating has one or more brand new data elements to substitute old ones. To achieve the first type updating, we simply locate the information item in the system and revise the descriptive data in the secondary storage unit (in the file 42). For the other two types of updatings, the changes of new relation elements must be made after the information items being updated have been located. The difference between these two types of updatings is that the one having some brand new data elements to replace the old ones has to store the new data elements into the BAM's 34 first before the revised information item is stored again.

C. Logic Design

In this system, the design of the BAM's 34 and the ternary state match indicator is similar to those used in the system described in the preceding chapter II. A little more peripheral circuit is added to the BAM's 34 of this system for the control of resolving multiple responses. The encoder part is still used for transmitting information from the BAM's to the RC but the decoder is eliminated. Major changes in the logic design of this system from the previous one reside in replacing the APU 38 by the RC 120.

i. Relation Cube and Relation Elements—FIG. 15

Figure 15:
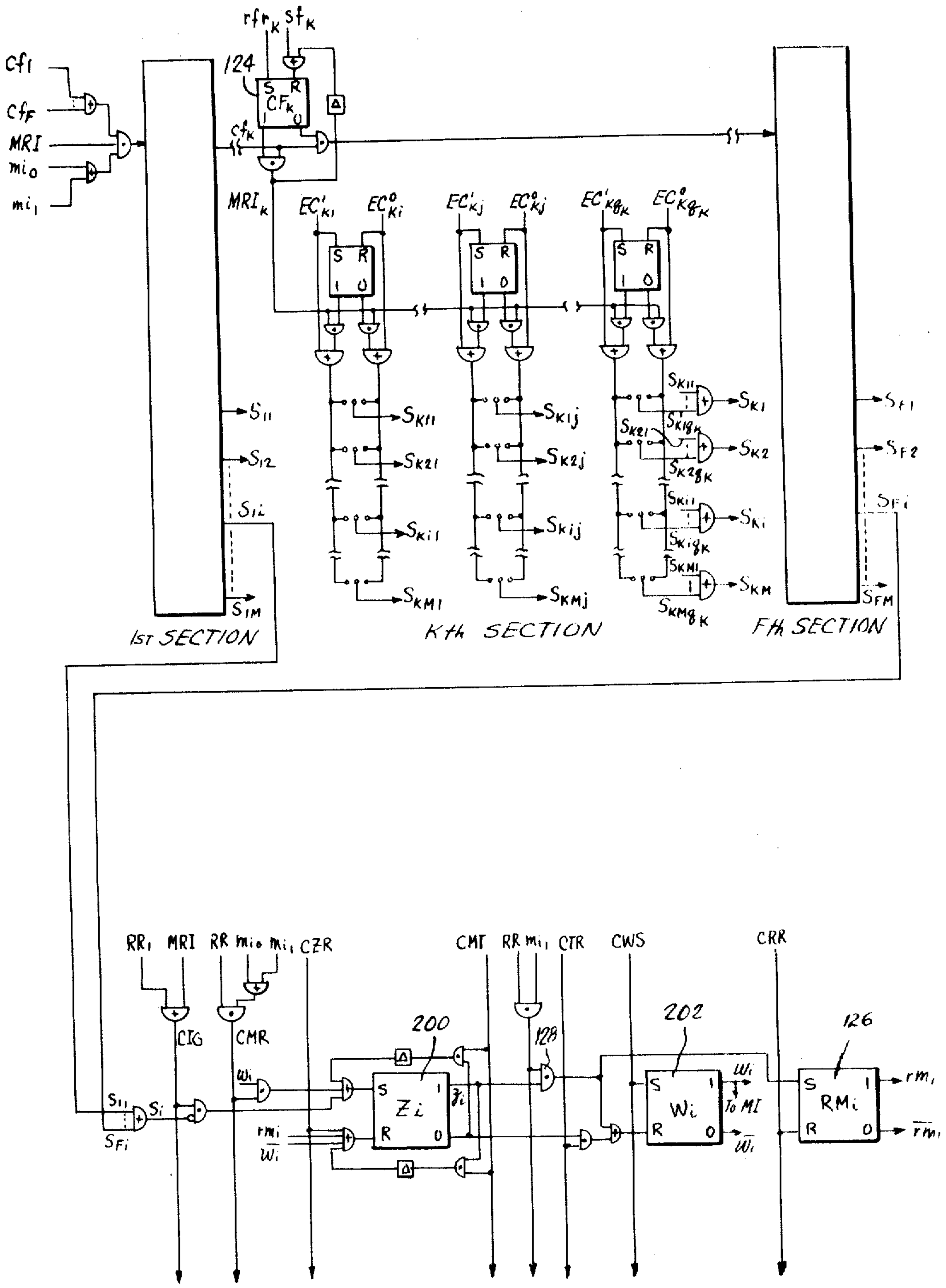
FIG. 15 is a block diagram illustrative of the relation cube and its match detector section as used in the system of FIG. 14.

With reference to FIG. 15, the relation cube has $$\sum_{K=1}^{F} q_K$$

pair of lines coming from the outputs of the encoders of the BAM's. On each of these lines M pin modules can be placed where M is the number of information items to be stored in the system.

A relation element consists of a pin module and several logic gates. On each pin module there are $$\sum_{K=1}^{F} q_K$$

pair of pins. These pins can be punched in a certain pattern according to the descriptor of the information item to be stored. The pin module is then placed in the RC. By having voltages on certain lines from the encoder, match or mismatch conditions can be detected through the pin modules and the logic gates.

Let us use a simple example to illustrate the function of the relation element. Suppose that a data element is coded as 0110; then the contact points labeled by 0110 at these bit positions shown in FIG. 15 are closed by the pins on the module. During interrogation the output of its logic gate at this particular section will not sense a voltage for match conditions. Otherwise, a mismatch signal is detected.

Since the match detector of a data element in the BAM 34 is set to mismatch state after it is retrieved, a section register for each section in the RC 120 is provided to store the code number of the data element during resolving of multiple responses. An extra flip-flop 124 (CF) for every section of the RC 120 is also provided for controlling the sequence of interrogations during the recovering of match condition in the RC 120.

Since the RC 120 is used only to detect the existence of an information item with specified data elements and to test the number of information items possessing a certain data element (or a set of data elements) as part of their descriptors, its capabilities are limited. To resolve multiple responses in the RC 120, the relations among the searches of all BAM's 34 should be AND; any composite search involving OR operations should be decomposed into several search operations. For example, a composite search like A·[(B+C)·D]+E·F should be expressed in a two-level Boolean form, A·B·D+A·C·D+E·F. Separate search and retrieval operations are performed for A·B·D, A·C·D, and E·F individually. In performing these three operations certain information items may be retrieved more than once if they match more than one search operation. An extra storage element 126 (RM) is needed to store the retrieved-word information to avoid the repeated retrievals.

The match detector section in the RC 120 of FIG. 15 is similar to that used in the APU 138. For each word it consists of a temporary match detector 200. (Z), a match detector 202 (W) and a retrieved-word mark 126 (RM). The response in the RC 120 to the code number of a responded data element is always ORed to those of the preceding data elements in the same BAM 34. The result of the OR operation is stored in the detector 200. The detector 202 stores the select condition or the current match condition of items in the RC 120. It is to be combined with the contents of the detector 200 through an AND operation to form a new match condition in the RC 120. The retrieved-word marks (RM's) stored in the detector 126 are used to keep track of the words already retrieved for composite search. We use the same example of composite search A·B·D+A·C·D+E·F, to illustrate the use of this RM bit. Before any operation is performed, the detector 126 is reset to 0 state. After the first search operation A·B·D is performed, the match condition stored in the detector is transmitted to the detector 126. When the next search A·C·D is performed, all those items retrieved in A·B·D are eliminated from the search operation since $rm_i$ always rests the detector 100 ($Z_i$) to mismatch state. New items retrieved by A·C·D are remembered by the detector 126 by transferring the match condition in the detector 200 to the detector 126 though an AND-gate 128. These items are then eliminated from the next search operation E·F.

Signals CZR, CRR, and CWS are used to reset the detectors 200, 126 and 202, respectively. Signal $CIG=RR_1+MRI$ is used to gate the inverted mismatch signals during interrogations. And CMT is for complementing the temporary match condition in the detector 200. The AND gates and OR gates shown in FIG. 15 are standard components and serve the indicated logical functions.

ii. Response-Resolving Control Circuit—FIG. 16

Figure 16:
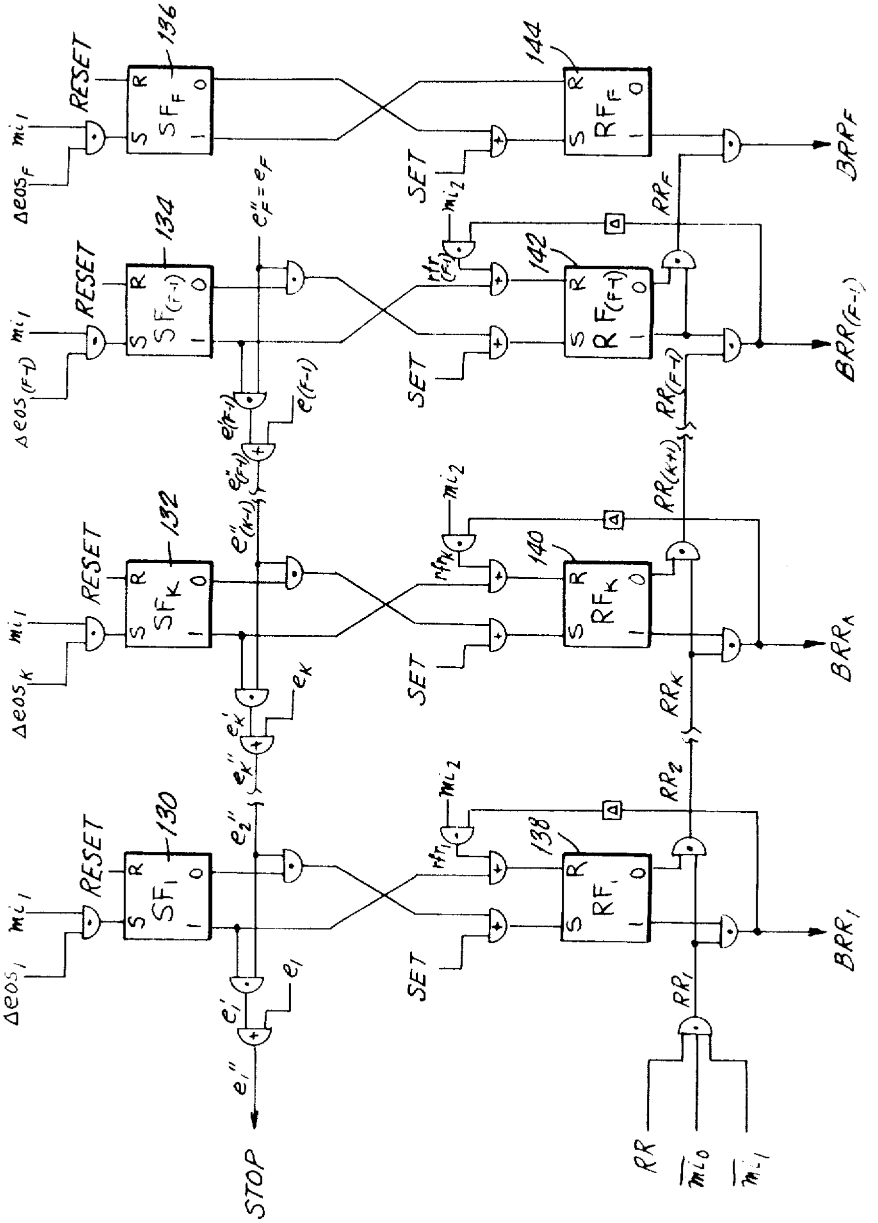
FIG. 16 is a block diagram illustrating a response-resolving control circuit of the system illustrated in Fig. 14.

The response-resolving control (RCC) circuit illustrated in FIG. 16 is designed to carry out the procedure for resolving multiple responses in the RC 120. This RCC circuit consists of two F flip-flops. The upper flip-flops 130, 132, 134 and 136 are called the single-response flag (SF) and are set whenever a single response to a search in the respective BAM is detected. The lower flip-flops 138, 140, 142 and 144 are called the response-resolving flag (RF). The first BAM 34 (the leftmost or the lowest indexed BAM) with this flag bit on will have the code number of one of its matched data elements retrieved at the next cycle. A BAM 34 with a single response always has its RF off, because single responses in BAM's need not be considered during the process of resolving multiple responses described above.

At the beginning of resolving multiple responses in the RC 120, the match conditions of the information items stored in the temporary match detectors 200 are transferred by CTR to the match detectors 202 as the select condition (refer to FIG. 15). When a matched data element is taken from the set of the matched data elements in a BAM 34, the response-resolving drive RR passes BAM's with $rf=0$ until it reaches the first BAM, BAM ($k_1$), with $rf_{k_1}=1$. The response-resolving signal in BAM ($k_1$) is then $$BRR\,(k_1) = (\overline{rf_1} \,.\,.\,.\,.\, \overline{rf_{k_1}} - 1) \cdot rf_{k_1} \cdot RR_1$$

where $RR_1=RR\cdot\overline{mi_0}\cdot\overline{mi_1}$. If there is any unchosen matched data element in BAM ($k_1$) the uppermost one is retrieved by BRR ($K_1$). The code number is stored in the $k_1$th section register in the RC 120 and, in the meantime, is also used to interrogate the RC. The temporary match detectors 200 of the mismatched information items are then reset after interrogation. If multiple responses are still detected in the RC 120, $RF_{k_1}$ is turned off by the RF reset signal $rfr_{k_1}$ which is $mi_2$·ABBR($k_1$). At the next cycle the RR signal will reach the next BAM with RF on, say BAM($k_2$), and would select one unchosen matched data element from it. In this manner the number of matched information items detected in RC is decreasing until only one matched information item is detected. The descriptive data of this matched item can now be retrieved. Its match detector 202 is reset and its retrieved-word mark bit 126 set. This mark bit will remain in set condition until the end of the retrieval operation so that the repeated retrieval of this information item is prevented. After a matched item is retrieved all temporary match detectors 200 are in mismatch state while the match detectors 202 provide the information of the rest of the information items to be retrieved. This information should be transferred (by CMR in FIG. 15) to the temporary match detectors 200 in order to select the next information item. The same action is required when selecting one matched data element sets the temporary match detectors 200 of all selected items to mismatch state. Following the recovering operation the interrogation of the code numbers stored in the section registers previous to the section initiating the recovering operation (except those associated with simple responded data elements) are performed. In other words only in those sections with $sf=0$ and $rf=0$, i.e., $cf=1$, the code numbers stored in the section registers are interrogated The interrogation of each previous section can be expressed in general as follows (refer to FIG. 15):

$$MRI_k=(\overline{cf_1}\cdot\overline{cf_2}\ldots\overline{cf_{k-1}})\cdot cf_k\cdot[MRI\cdot(mi_0+mi_1)\cdot(cf_1+cf_2+\ldots+cf_F)]$$

where *MRI is a constantly applied voltage and*

$$cf_k=rf_{F_k}\cdot\overline{(cf_k\cdot AMRI_k)}$$

Following these interrogations the RR signal (FIG. 16) will continue to select a matched data element from BAM's 34 with multiple responses in the manner described above.

When the matched data elements in a BAM 34 have all been used to interrogate the RC 120, a signal $e_k$ is sensed at the application of the RR signal. This signal will cause the restoration of the match condition in BAM($k$) (FIG. 10) and turn on the RF of the preceding BAM 34 with multiple responses (FIG. 16). The match condition in the detector 202 is then transferred to the detector 200 followed by the serial-by-section interrogation. The RR signal of the next cycle is now applied to select an unchosen matched data element from the preceding BAM 34 with multiple responses. When $e_1''=1$ is reached this indicates that all information items have been retrieved and the operation can be terminated.

During the whole process of resolving multiple responses $RR_k$ and $e_k''$ signals in the RCC circuit (FIG. 16) pass through SF and RF of BAM's with single responses without any effect on them. RR signal is used to retrieve each single response in the RC120 by activating the signal $CRO=RR\cdot mi_1$ and it is also used to restore the match condition by energizing $CMR=RR\cdot(mi_0+mi_{1b})$ (FIG. 15). The response-resolving signal to BAM's is blocked by adding $\overline{mi}_0$ and $\overline{mi}_1$ each with RR so that no matched data element is selected when a matched information item is being retrieved and the match condition is to be restored.

iii. Response-Resolving Control Circuit for the Alternative Procedure—FIG. 17

One of the procedures for resolving multiple responses discussed previously separated BAM's 34 with multiple matched data elements into two groups: (a) BAM's 34 with matched responses between 2 and ($n_k-1$) and (b) BAM's 34 with $n_k$ responses (masked BAM's). The processing of BAM's with multiple responses is in such an order that those BAM's belonging to group (a) rate treated first. Some additional logic devices are added to the RCC circuit just described to implement this alternative procedure For example, a mask flag bit (MF), stored in flip-flops 146 is provided for each BAM. This bit is set if its corresponding BAM is masked in a search operation. Otherwise it remains off. One extra flip-flop 148 is used to control the different groups of BAM's 34 upon which the response-resolving signals are applied. At the beginning of this procedure the BAM'34 with single responses have their flag flip-flops 146 set as follows: $mf=1$, $sf=0$, and $rf=1$. The flip-flop 148 is first reset and remains in that state until the procedure has gone through all BAM's 34 of group (a). If multiple responses are still sensed in the RC 120 (point D in the last flow chart), the flip-flop 148 is turned on. The masked BAM's 34 are now treated. The response-resolving signal for BAM($k$) can be expressed in general as follows (FIG. 17):

$$BRR_k=(mf_k\oplus p)\cdot rf_k\cdot RR_k\ k=1,2,\ldots F,$$

and $$p=\Delta RR_{F+1},$$

where $$RR_1=RR\cdot\overline{mi_0}\cdot\overline{mi_1};\ RR_{n+1}=RR_n\cdot[(mf_n\oplus p)+\overline{rf_n}]\,n=1,2,\ldots,F.$$

In other words, during $p=0$ when RR signal is applied only the matched data element of the first unmasked BAM 34 with multiple responses and $rf=1$ will be retrieved. During $p=1$ the RR signal will retrieve one unchosen data element from the first masked BAM 34 with $rf=1$.

When any masked BAM 34 has all its data elements (all are treated as matched ones) processed (P has been in state 1) the $e_k$ signal will activate the setting of all match detectors of this BAM to match state and reset RF of the preceding masked BAM. If there is no masked BAM preceding this one, P is turned off and RF of the last-unmasked BAM with multiple responses will be reset. When any unmasked BAM with multiple responses has all its matched data elements processed (P has been in the state 0) the $e_k$ signal will activate the restoring of the match condition in the BAM and reset the RF of the preceding unmasked BAM with multiple responses preceding to this one, the process terminates. We can expect the RF resetting signal RB as follows:

$$RB_F=\overline{(mf_F\oplus p)}\cdot\overline{sf_F}\cdot\Delta e_1''$$

$$RB_k=\overline{(mf_k\oplus p)}\cdot\overline{sf_k}\cdot e_{k+1}''\ k=1,2,\ldots,(F-1),$$

and $$\overline{p}=\Delta e_1''$$

where $e_{k+1}''$ is dependent on $e_n''\ n>k+1$:

$e_F''=e_F$ $e_n''=e_n+[(mf_n\oplus p)+sf_n]\cdot e_{n+1}'',n=(F-1),(F-2),\ldots,1.$ Lastly, $e_1''\cdot\overline{p}=1$ terminates the process.

IV. AN ASSOCIATIVE MEMORY SYSTEM WITH MULTILEVEL RELATION CUBES (DECOMPOSED CASE)

A. Decomposition of a BAM

In the previous chapters II and III, we used BAM's 34 to store all distinct data elements of different fields and an APU 38 or RC 120 to store the relationships established among data elements. A great number of associative memory storage spaces occupied originally by redundant data elements are thus saved. Although a BAM 34 usually stores the smallest units of information (data elements) there is still some degree of redundancy in storage. For instance, in the author field of a library catalog all the names are distinct in a BAM 34, but at each letter position there are only 26 distinct letters. In order to save even more associative memory cells, we may break up a BAM 34 and use a relation cube to store the relationships among the letters. If necessary, we may even break the data elements down to bits, that is, to treat each bit as a small BAM and to form data elements by appropriately relating the bit information and storing it in a small RC.

In this RSC we may call BAM's storing data elements the first-level BAM's and those storing smaller units of information the second-level BAM's. Likewise, the relation cube which stores the relationships among data elements is called the first-level RC and those which store relationships among smaller units of information are called the second-level RC's. Thus, if a first-level BAM is decomposed, it consists of some second-level BAM's and a second-level relation cube. In an associative memory system, we may not have to decompose all the first-level BAM's. And in a decomposed first-level BAM, the number of second-level BAM's, or the degree of decomposition may vary as required.

For purposes of illustrating the extreme case, a totally decomposed case in which every first-level BAM is decomposed into one-bit second-level BAM's is described below.

B. Organization

Compared with the organization of the system having the RC 120, as previously described, the present system differs only in the internal structure of the first-level BAM's. The rest of the system remains the same.

i. Second-Level BAM's

Since the second level BAM is used to store bit information of data elements, it has only two different contents, 0 and 1.

Therefore the second-level BAM is a two-word associative memory with one bit per word. The association register and the mask register are also one bit long in the second-level BAM.

Generally, the sense output of an associative memory is determined by the comparison of contents of the memory storage and the interrogation information. A signal from the sense wire will be detected whenever there is a mismatch in the word. However, for an associative memory of only two words with one bit per word, there is no real need to compare the contents of the memory and the interrogation information. Search operation in the second-level BAM must be an "Equal-To" search. During the search process, one of the two words in the memory must match the interrogation criterion. The memory part of the second-level BAM in this system can be eliminated, because we can always apply a signal directly on one of the two sense wires of the two-word second-level BAM. Therefore, instead of performing interrogation in the second-level BAM, we apply interrogation directly to the second-level relation cube shown in FIG. 17. Since the second-level BAM's can be eliminated in this totally decomposed system, from now on we shall call the first-level BAM's simply the BAM's.

ii. Second-Level Relation Cube—FIG. 17

The second-level relation cube stores the relationships among bit information to form a complete set of distinct data elements. In analog to the storage in the first-level relation cube, the actual number of stored data elements is usually much less than the number of possible combinations of bit information, i.e., $$2^{n_k} \gg m_k$$

where $m_k$ and $n_k$ are the number of stored data elements and number of bits per data element in the $k$th (first-level) BAM 34, respectively.

The search and retrieval operations of data elements are performed in this unit. To have the BAM be comparable with the BAM's in the previous systems, we should provide it with the capability of both ordered retrievals and resolving multiple responses.

We still use pin modules for the second-level relation elements. For different second-level RC's, different sizes of pin modules are employed.

C. Functional operations i. Storing

As performed in the other systems, storing of an information item begins with interrogations of data elements in all BAM's. If a data element is not found in the BAM, a pin module is punched and inserted into the contact positions of an available space in the second-level RC. After all data elements of the new information item are identified another pin module is punched in a pattern according to the BIC numbers of those data elements. It is then placed in the first-level RC.

ii. Search Operations in BAM

Various search operations in the BAM's are performed in the same way as described in the previous systems although the internal structures of the BAM's are quite different. Interrogations are still performed in a serial-by-bit mode in each BAM. The match detectors are provided to store the match conditions as before and the match indicator is also provided to detect the number of responses to be zero, one or multiple.

iii. Resolving Multiple Responses and Ordered Retrievals in BAM

The resolution of multiple responses in the BAM of this system is similar to that of the systems described under heading II and III. Since the BAM of this system contains the second-level relation cube as the unit for testing relationships among bits we have to develop another procedure for ordered retrievals. Unlike the BAM's used in the other systems, the second-level RO in this system can not be sensed columnwise.

The procedure for ordered retrievals in this system takes a serial-by-bit interrogation, and is performed from left to right. After each interrogation the number of responses is detected by the match indicator. In an ascending order retrieval, 0 is interrogated at each bit position until either zero or single response is detected. For zero responses, the match condition is restored and the last interrogation bit is masked. If a single response is detected, the matched data element is retrieved, its match detector is reset, and the last interrogation bit is also masked. A masked bit will not be interrogated from the next cycle on. When a bit is being masked any masked bit to its right becomes unmasked. This process is repeated until all matched data elements have been retrieved. The flow chart of this procedure is shown below.

Flow Chart No. 7

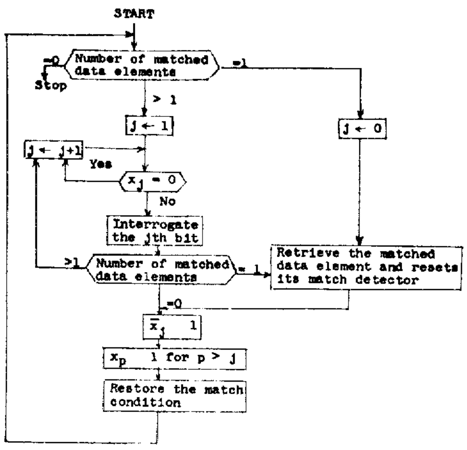

iv. Retrieval Operations in the System

Resolving multiple responses in a second-level relation cube of this system follows the same procedure as in BAM's of the system described under the preceding heading III since sequencing circuits are used in both systems. Resolving multiple responses in the first-level relation cube would be the same as that described under section B.(iv) in connection with the previous system.

Resolving multiple responses with ordered retrieval also follows the same procedure as described in section B.(iv) under heading III; the only difference is that step (β) is implemented by the procedure described in part (iii) of this section.

v. Deleting and Updating

Deletion and updating of an information item are similar to the procedures described before. However, in this system deleting a trivially stored data element is achieved by removing the corresponding pin module from the second-level relation cube instead of clearing the storage in an associative memory.

D. Logic Design i. BAM—FIG. 18.

A BAM in this system consists of an interrogation and ordered retrieval control circuit 150, a second-level relation cube and a match detector section 156. Since it is required to perform ordered retrieval in this unit, each data element is provided with a mark bit ($BM_{ki}$) storage 152 to store the select conditions during the process. The output of this storage 152 ($bm_{ki}$) together with the match state ($a_{ki}$) controls through AND-gates 154 the data element to be interrogated or read out. With the storage 152 being reset, the match detector 156 remains in mismatch state (FIG. 10). When a matched data element is to be read out, only one mark bit is on ($bm_{ki}$=1). When the data element is retrieved, this bit is reset.

The interrogation and ordered retrieval control circuit is described in more detail in the following section. The match detector section 156 is structured exactly the same as that used in the BAM's of the previous systems. An encoder is still utilized to link the BAM and the first-level RC.

The second-level RC is structured much the same as the RC used in the system described in connection with the RC 120 except that it is smaller and at each contact position there is one logic element provided for the data element readout. During the ordered retrieval, when a single response is detected after an interrogation, the matched data element is read out by energizing the interrogation lines, $I_{ij}^{o}$'s. The readout information is sent to the association register, which acts as an output buffer.

ii. Interrogation and Ordered Retrieval Control Circuit in BAM—FIG. 19.

This unit consists of three registers, 160, 162 and 164, storing respectively, $X_k$, $B_k$ and $D_k$. The mask register 160 is used to store the mask condition specified in "Similar-To" search operations and ordered retrievals. A 0 value in the *j*th bit of the register 160 means skipping the *j*th bit during interrogations. The content of the register 164 is determined by $$d_{kj}=(u_{kj}\cdot x_{kj}),$$

where $u_{kl}=CP\cdot mi_0$, and $u_{kj}=u_{k(j-1)}\cdot\overline{x_{k(j-1)}}+\Delta SLI_{k(j-1)}$.

The register 106 is originally set for ordered retrievals and all search operations except SMT. It is reset in the ordered retrieval when zero or single response is detected after the corresponding bit is interrogated, i.e., $$\overline{x_{kj}}=(\Delta SLI_{kj})\cdot(mi_0+mi_1).$$

When any bit to the left of the masked *j*th bit ($x_{kj}=0$) is being masked ($v_{kl}=1$), the register 160 is set. That is, $$x_{kj}=v_{kj}=v_{k(j-1)}+[\Delta SLI_{k(j-1)}]\cdot(mi_0+mi_1)\ j=2,3,\ldots,n_k,$$

and $$v_{kl}-CP\cdot mi_r.$$

The association register 162 stores (1) information to be interrogated or stored in BAM, or (2) data element to be read out ($RO_{kj}^{1}$ and $RO_{kj}^{0}$). The first kind of storage is sent into the interrogation register through the "Input" lines. The data element read out from the memory is temporarily stored in the storage 162 and then transmitted to I/O channel. The interrogation selector 164 controls the bit position to be interrogated. Only one bit of this selector is on at a time. After each interrogation the bit position to be interrogated advances to the next unmasked bit to its right. When the rightmost bit has been interrogated, a signal $eob_k=(CP\cdot\overline{mi_0}\cdot\overline{mi_1})\cdot d_{kn_k}=1$ is sensed and the search operation is terminated ($eob_k$ not shown in FIG. 19).

Two interrogation lines, $I_{kj}^{1}$ and $I_{kj}^{0}$, are expressed as $$I_{kj}^{1}=(CP\cdot\overline{mi_0}\cdot\overline{mi_1})\cdot d_{kj}\cdot b_{kj}$$

$$I_{kj}^{0}=(CP\cdot\overline{mi_0}\cdot\overline{mi_1})\cdot d_{kj}\cdot \overline{b_{kj}}+CP\cdot mi_1.$$

The second term of the second equation, $(CP\cdot mi_1)$, is applied for reading out a matched data element.

Figure 19:
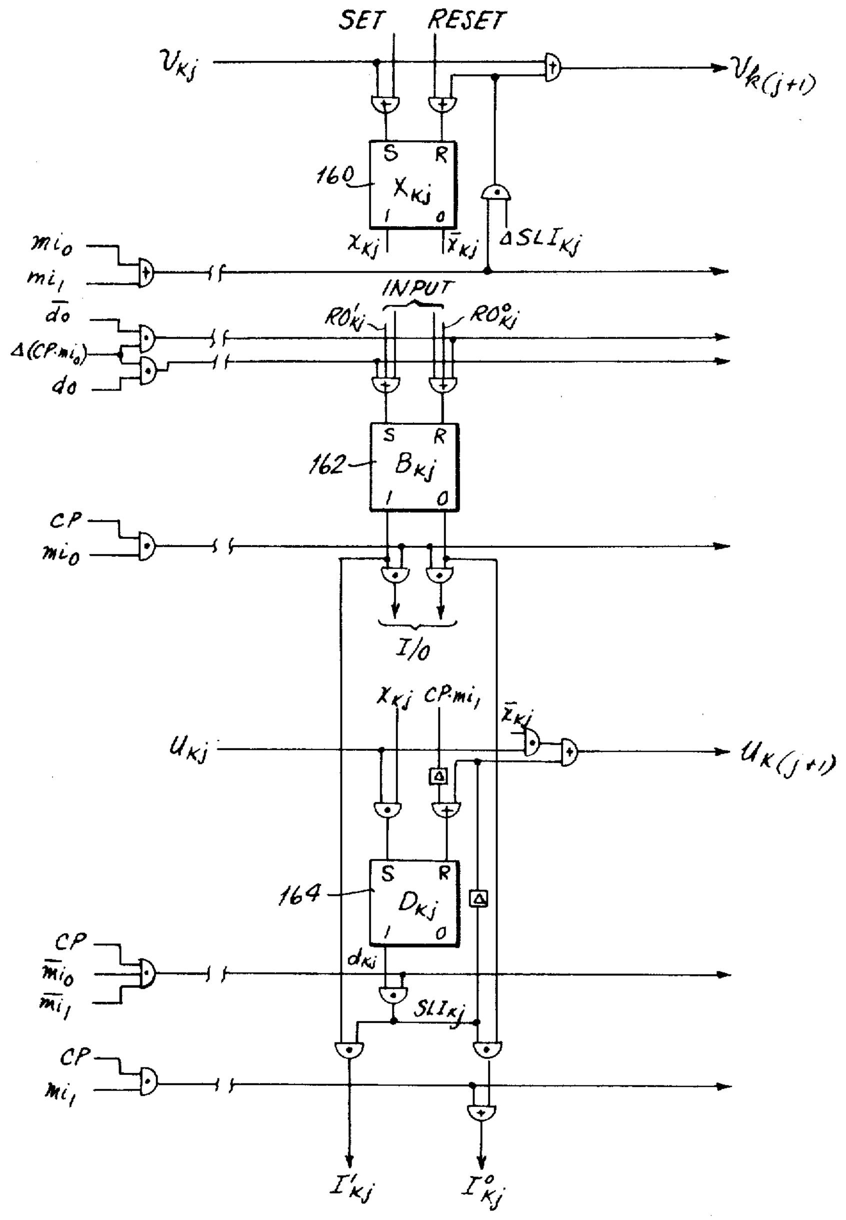
FIG. 19 is a block diagram of an interrogation and ordered retrieval control circuit associated with the *j*th bit of the *k*th BAM of the modified associative memory system to which FIG. 18 relates.

At the beginning of an ordered retrieval operation, all bits of the association register 162 are set to 0 for ascending order and 1 for descending order and the match indicator is reset ($mi_r=1$). When the first clock pulse (CP) is applied, the leftmost bit of the interrogation selector 164 is set [$v_{kl}=CP\cdot(mi_r+mi_1)$]. The first bit position is interrogated by the second pulse. The number of the matched data element is always detected after each clock pulse is applied. If multiple responses are detected, the next unmasked bit will be interrogated. If a single response is detected ($mi_1=1$), CP is applied to read out the matched indicator while the interrogation is inhibited by $\overline{mi_1}$ (FIG. 19). ($CP\cdot mi_1$) also resets the match detector of the retrieval data element and all bits of the interrogation selector. The match indicator will indicate a zero response ($mi_o=1$) at this moment. CP of the next cycle is applied to transmit the data element from the association register 162 to I/O channel ($CP\cdot mi_{oa}$). It is also used to restore the match condition (with the retrieved data element deleted from the set of matched data elements) and set the leftmost unmasked bit of the interrogation selector 164. The procedure repeats until all matched data elements have been retrieved (a signal $\Delta(CP\cdot mi_o)\cdot mi_o=1$ is sensed).

In this system, each cycle has only one clock pulse, CP. The content of the association register 162 is never changed for interrogations in ordered retrieval. If the ordered retrieval is performed in an ascending order, only 0 will be interrogated. In the case of descending order, only 1 will be interrogated.

iii. Match Detector and Encoder Sections—FIG. 18.

Figure 18:
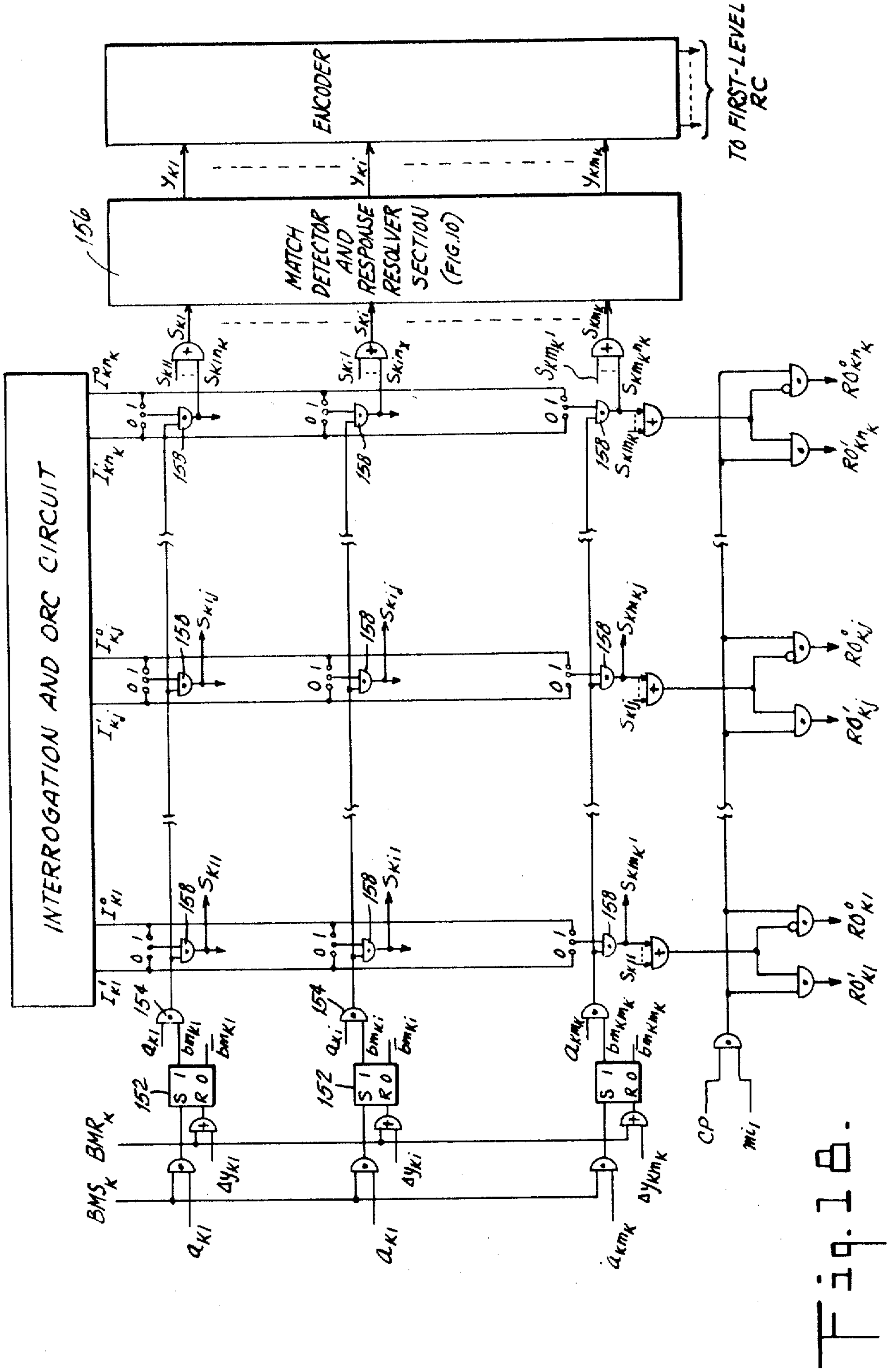
FIG. 18 is a block diagram illustrating the structure of a second-level relation cube of a modified associative memory system involving decomposing basic associative memories and relation cubes.

The match detector section 166 of the BAM of FIG. 18 has the same structure as that shown in FIG. 10. The encoder section is the same as that used in the previously described system.

iv. First-Level Relation Cube

Figure 17:
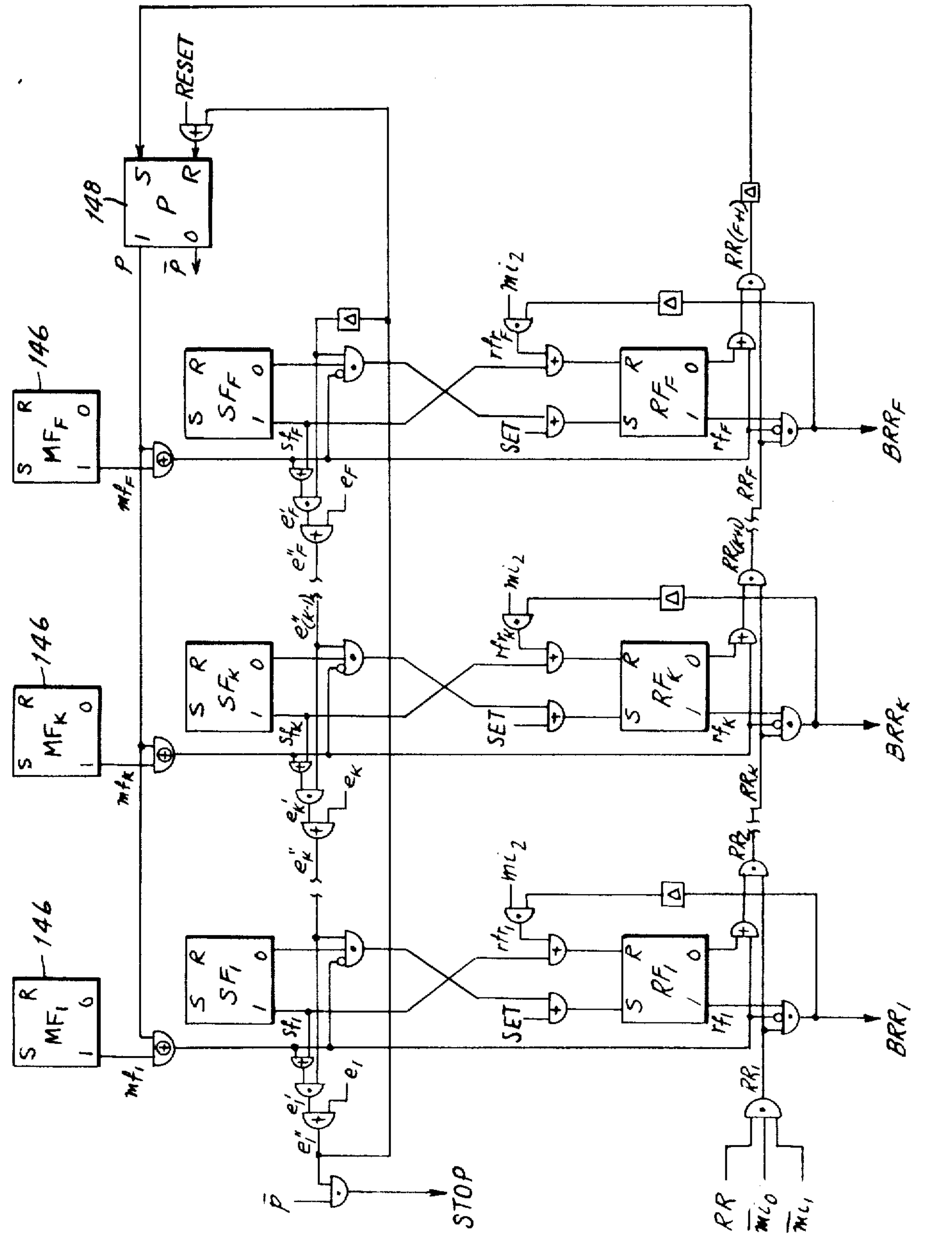
FIG. 17 is a block diagram of an alternative response-resolving control circuit for use with the system illustrated in FIG. 14.

The structure of the first-level relation cube is not changed from that used in the previous system. Section registers and response resolver control (RCC) circuit are provided for resolving multiple responses in RC as before (FIGS. 16 and 17).

In concluding summary, the invention is an associative memory system for storing retrievably a plurality of information items, each information item including a descriptor (or tag), each such descriptor subdivided into fields containing information items. Information items are stored in a plurality of basic associative memories (BAM's 34), each BAM 34 storing data elements from the same field of different information items. Means in the form of access circuitry are provided for storing and retrieving data elements from the BAM's 34; and means in the form of search operation circuitry are provided for preventing the repeated storage of a data element in a BAM 34.

Each data element stored in a BAM 34 is associated, by means of indications of relationship, with other data elements from other BAM's such that a set of associated data elements, one from each BAM, make up the entire information item stored in the system. The indications of relationship may be stored in the associative processing unit (APU) 38, or in the relation cube (RC) 120. When the APU 38 is used, each BAM 34 includes a section 36 for storing a unique indexing code for each of the data elements of the BAM, and the APU 38 stores words composed of the indexing codes of the data elements comprising information items stored in the system. When the RC 120 is used, the sections 38 are replaced by encoders generating a unique code for each of the data elements in a BAM; the codes of the data elements of an information item stored in the system are linked in a set by storage devices in the RC 120. The storage devices may be semipermanent devices, such as pin modules.

One or more BAM's may be decomposed to different levels of decomposition, such that such higher level BAM stores only subfields of the data elements of the original BAM. The higher level BAM's are served by relation cubes similar to the RC 120.

Means and procedures are provided for various point and line searches, for ordered retrievals in descending or ascending order, and for deletions. A modification is described for use in a dictionary-type system which utilizes only a single BAM having as data elements the alphabet letters and, perhaps, special characters, and utilizing also an F-dimensional relation cube, where F is the length, in characters, of the longest word stored in the system.

GLOSSARY OF SYMBOLS USED IN THE SPECIFICATION AND IN THE DRAWINGS

Note: Subscript *k* denotes the *k*th BAM, *i* indicates the *i*th word and *j* designates the *j*th bit of a word.

| | |
|---|---|
| $\alpha_1, \alpha_2, \ldots \alpha_m$ | Input symbols. |
| $AF_i, af_i$ | Final match detector and its output. |
| AFR | Reset signal of $AF_i$'s in APU. |
| AIC | Mismatch signal control in APU. |
| ALS | Set signal of $L_i$'s in APU. |
| *aor* | Column sense output gate control in APU |
| APU | Associative processing unit. |
| *ard* | Readout gate control in APU. |
| ARI | Resolving multiple responses select control in APU |

| | |
|---|---|
| ASP | Screening process select control in APU. |
| ATS | Set signal of $Z_i$'s in APU. |
| AWR | Reset signal of $W_i$'s in APU. |
| AZW | Transfer Z to W signal in APU. |
| $B_k$ | Association register of the *k*th BAM. |
| $B_{kj},b_{kj}$ | The *j*th bit of the association register and its output. |
| $B_{kij},b_{kij}$ | Memory cell and its content. |
| BAM | Basic associative memory storing data elements distinct. |
| BIC | Binary indexing code. |
| $BM_{ki},bm_{ki}$ | Mark bit in BAM and its output. |
| $BAS_k$ | Set signal of match detectors in BAM. |
| $BMS_k,BMR_k$ | Set and reset signals of mark bits in BAM. |
| $BRR_k$ | Response resolving signal in BAM. |
| $bs_{kj},br_{kj}$ | Input signals of $B_{kj}$. |
| BSC | BAM sequence control register. |
| $c_{kj}$ | Interflow signal in ORC circuit. |
| $CF_k,cf_k$ | Section control flag and its output. |
| CIG | Mismatch signal gate control in RC. |
| CMR | Match condition restoration control in RC. |
| CMT | Complementing signal. |
| $CP,cp_1,cp_2$ | Clock pulses. |
| CRO | Readout drive in RC. |
| CRR | Reset signal of retrieval-word mark bits. |
| $CS^0_{kj},CS^1_{kj}$ | Column sense outputs. |
| $CSI_k$ | Column sense interrogation drive. |
| CTR | Transfer Z to W signal in RC. |
| CWS | Set signal of $W_i$'s in RC. |
| CZR | Reset signal of $Z_i$'s in RC. |
| $D_k$ | Interrogation selector. |
| $D_{kj},k_{kj}$ | One bit of the interrogation selector and its output. |
| $DC^0_{ki},DC^1_{ki}$ | Inputs of the decoder. |
| $\Delta$ | Delay element. |
| $ds_{kj},dr_{kj}$ | Input signals of $D_{kj}$. |
| $e_k$ | End of response resolving signal. |
| $e_k'$ | Interflow control signal in RRC circuit. |
| $EC^0_{ki},EC^1_{ki}$ | Outputs of the encoder. |
| $eob_k$ | End of bit interrogation signal. |
| $eos_k$ | End of search operation signal. |
| F | Number of BAM's. |
| $f_{kj}$ | Interflow control signal in ORC circuit. |
| $G_{ki},g_{ki}$ | Lock bit in BAM and its output. |
| $I^0_{kj},I^1_{kj}$ | Interrogation lines. |
| $ID_k$ | Interrogation drive. |
| $L_i,l_i$ | Compound match detector in APU and its output. |
| M | Number of information items stored in the system. |
| $m_k$ | Number of distinct data elements stored in BAM. |
| $MF_k,mf_k$ | Mask flag and its output. |
| $mi_0$ | Zero response indicator. |
| $mi_1$ | Single response indicator. |
| $mi_2$ | Multiple responses indicator. |
| $mi_r$ | Reset state of the match indicator. |
| MRI | Interrogation signal in RC. |
| $n_k$ | Number of bits per word in BAM. |
| $OCS^0_{kj},OCS^1_{kj}$ | Double column sense outputs for ordered retrieval. |
| ORC | Ordered retrieval control circuit. |
| P, $p$ | Response resolving control flip-flop and its output. |
| $p_{kj}$ | Interflow control signal in ORC circuit. |
| $q_k$ | Number of bits in BIC. |
| RC | Relation cube. |
| $RD_k$ | Readout drive. |
| $RF_k,rf_k$ | Response-resolving flag and its output. |
| $rfr_k$ | Reset signal of $RF_k$. |
| $RM_i,rm_i$ | Retrieved-word mark bit and its output. |
| $RO^0_{kj},RO^1_{kj}$ | Readout information. |
| RR | Response-resolving signal. |
| $RR_k$ | Interflow control signal in RRC circuit. |
| RRC | Response-resolving control circuit. |
| $rs_{ki}$ | Read and column sense select. |
| $S_{ki}$ | Word mismatch signal. |
| $S_{kij}$ | Bit mismatch signal. |
| $sb_{kj}$ | Interrogation bit information setting signal. |
| $SF_k,sf_k$ | Single response flag and its output. |
| $SLI_k$ | Select interrogation drive. |
| ST, $st$ | START flip-flop and its output. |
| $u_{kj}$ | Interflow control signal in ORC circuit. |
| $v_{kj}$ | Interflow control signal in ORC circuit. |
| $W_i$, $w_i$ | Match detector and its output. |
| WLC | Word length control register. |
| $wo_i$ | Word output. |
| $ws_{ki}$ | Write select. |
| $wt_i$ | Write control signal. |
| $X_k$ | Column sense output register or mask register. |
| $X_{kj},x_{kj}$ | One bit of the register $X_k$ and its output. |
| $xr_{kj}$ | Reset signal of $X_{kj}$. |
| $xx_{ki}$ | Output of the decoder. |
| $Y_{ki}$ | Word output in BAM. |
| $Z_i,z_i$ | Temporary match detector and its output. |

I claim:

1. An associative memory system for storing retrievably a plurality of information items, each information item including a descriptor or tag, each descriptor or tag subdivided into a plurality of fields, each field containing a data element, said associative memory comprising:

a. a plurality of basic associative memories, each for storing a plurality of data elements from the same field of different information items;

b. means for storing in each basic associative memory data elements of the same field only and for retrieving stored data elements from said basic associative memories;

c. means for preventing the storage of identical data elements in a single basic associative memory, thereby storing in each basic associative memory only data elements which are distinct from each other;

d. means for storing, for each data element stored in a basic associative memory, indications of relationship with data elements stored in other basic associative memories, each set of such indications linking together a plurality of data elements identical to the data elements of a distinct information item stored in the basic associative memories by the means of subparagraph (b) and (c).

2. System as in claim 1 including in each of said basic associative memories a storage section for indexing codes, one unique indexing code for each data element of a basic associative memory.

3. System as in claim 2 including in said means for storing indications of relationship an associative processing unit for storing retrievably a plurality of words, one for each information item stored in the basic associative memories, each such word comprising the indexing codes of the data elements of its corresponding information item.

4. System as in claim 1 including in each basic associative memory an encoder for generating a unique code for each data element of the basic associative memory, and including in said means for storing indications of relationship storage devices linking in a set the codes of the data elements of individual information items stored in the basic associative memories.

5. System as in claim 4 wherein said storage devices are semipermanent storage devices.

6. System as in claim 1 including at least one decomposed basic associative memory comprising a plurality of *n*th level (*n*=2, 3 ...) decomposed associative memories, each for storing unique subfields of data elements, and means for storing relationships between said subfields of data elements or between sets of such subfields.

7. System as in claim 1 including means for retrieving in the order of their magnitudes data elements stored in a basic associative memory.

8. System as in claim 7 including means for selectively retrieving data elements stored in a basic associative memory either in ascending or descending order of their magnitudes.

9. System as in claim 7 including in said means for ordered retrieval:

a. means for sense-interrogating sequentially columns of same order bits of data elements to determine if the sense-interrogated column consists only of identical bits or whether it consists of both 0 and 1 bits;

b. means for select-interrogating only those columns consisting of both 0 and 1 bits to select the bits identical to a search criteria bit;

c. means for identifying the data elements containing the selected bits and classifying said data elements as selected data elements;

d. means for determining if only one data element has been selected or if more than one data elements have been selected;
e. means responsive to a determination that only one data element has been selected for retrieving said data element;
f. means responsive to a determination that more than one data elements have been selected for causing sense interrogation of the next column of the sequential order of columns.

10. System as in claim 3 including:
a. means for performing point searches in sequential basic associative memories according to predetermined associative criteria;
b. means responsive to the detection of a data element matching an associative criterion for retrieving from the point-searched basic associative memory the indexing code of the matching data element;
c. means for performing a search in the associative processing unit to select words therein having in the corresponding position an indexing code identical to the retrieved indexing code;
d. means for performing line searches in sequential basic associative memories that have already been point-searched by line-searching only the data elements which have indexing codes identical to indexing codes contained in the corresponding positions of selected words from the associative processing unit; and
e. means for retrieving from the basic associative memory in which a line search is being performed the indexing code of each data element which matches the associative criteria for the line search and which also has an indexing code equal to the corresponding indexing code of said selected words.

11. System as in claim 4 including means for retrieving in the order of their magnitudes data elements stored in a basic associative memory in bit columns and data element rows, said last-mentioned means comprising:
a. means for select-interrogating sequentially unmasked columns, starting with the column containing the most significant bits of the stored data elements, to select bits matching a search criterion;
b. means responsive to a determination that none of the select-interrogated bits match the search criterion to cause select-interrogation of the next column to the right;
c. means responsive to a determination that only one bit matches the search criterion to cause the retrieval of the data element containing that bit, to cause masking of the column containing the matching bit, and to cause unmasking of any previously masked columns to the right of the column containing the matching bit; and
d. means responsive to a determination that more than one bit match the search criterion to cause select interrogation of the next column to the right.

12. System as in claim 3 including means for deleting an information item from the system, comprising:
a. means for searching the basic associative memories by using the information item to be deleted as a search criteria to locate a data element constituting a unique response to the search;
b. means for identifying said data element;
c. means for extracting the indexing code of said element;
d. means for searching the associative processing unit to locate the word containing the extracted indexing code in the proper position; and
e. means for deleting said identified data element from its basic associative memory and said located word from the associative processing unit.

13. An associative memory system for storing retrievably a plurality of information items, each information item subdivided into a plurality of fields, each field containing a data element, comprising:
a. a single basic associative memory for storing data elements;
b. means for storing in said basic associative memory those data elements of any field of the information items stored in the system which data elements are distinct from each other;
c. means for storing in an F-dimensional relation cube, where F is the number of fields into which the information items are subdivided, sets of indications of relationship between data elements, each set linking together data elements identical to the data elements of the fields of an information item stored in the system.

14. Method of storing retrievably a plurality of information items, each information item including a descriptor or tag, each descriptor or tag subdivided into a plurality of fields, each field containing a data element, comprising the steps of:
a. storing a plurality of data elements from the same field of different information items in separate basic associative memories;
b. preventing the storage of identical data elements in a single basic associative memory, thereby storing in each basic associative memory only data elements which are distinct from each other;
c. storing, for each data element stored in a basic associative memory, indications of relationship with data elements stored in other basic associative memories, each set of such indications linking together a plurality of data elements identical to the data elements of a distinct information item stored in the basic associative memories in steps (a) and (b).

15. Method as in claim 14 including the step of storing in each of said basic associative memories indexing codes, one unique indexing code for each data element of a basic associative memory.

16. Method as in claim 15 including in the step of said means storing indications of relationship the step of storing retrievably in an associative processing unit a plurality of words, one for each information item stored in the basic associative memories, each such word comprising the indexing codes of the data elements of its corresponding information item.

17. Method as in claim 14 including the step of generating a unique code for each data element of a basic associative memory, and including the step of storing indications of relationship based on said codes to link in a set the codes of the data elements of individual information items stored in the basic associative memories.

18. Method as in claim 14 including the step of decomposing at least one basic associative memory into a plurality of $n$th level ($n$=2, 3 ...) decomposed associative memories, each for storing unique subfields of data elements, and the step of storing relationships between said subfields of data elements or between sets of such subfields.

* * * * *

UNITED STATES PATENT OFFICE
CERTIFICATE OF CORRECTION

Patent No. 3,618,027 Dated November 2, 1971

Inventor(s) Tse-yun Feng

It is certified that error appears in the above-identified patent and that said Letters Patent are hereby corrected as shown below:

Column 29, line 15, the lower limit of $\Sigma$ should read -- k = 1 --.

Column 30, line 3, center all the dots in the equation.

Column 31, line 10, in the equation "k11" should read -- k-1 --.

Column 32, line 53, "RSC" should read -- system --.

Column 33, line 69 "RO" should read -- RC --.

Column 35, line 22, "(j11)" should read -- (j-1) in all three cases.

Signed and sealed this 12th day of September 1972.

(SEAL)
Attest:

EDWARD M.FLETCHER,JR.
Attesting Officer

ROBERT GOTTSCHALK
Commissioner of Patents